United States Patent [19]
Hattori

[11] Patent Number: 5,867,727
[45] Date of Patent: Feb. 2, 1999

[54] SYSTEM FOR JUDGING READ OUT TRANSFER WORD IS CORRECT BY COMPARING FLAG OF TRANSFER WORD AND LOWER BIT PORTION OF READ DESTINATION SELECTION ADDRESS

[75] Inventor: Hiroshi Hattori, Kawasaki, Japan

[73] Assignee: Fujitsu Limited, Kawasaki, Japan

[21] Appl. No.: 79,385

[22] Filed: Jun. 21, 1993

[30] Foreign Application Priority Data

Jun. 24, 1992 [JP] Japan .................................. 4-165160
Apr. 2, 1993 [JP] Japan .................................. 5-076714

[51] Int. Cl.⁶ .................................................. G06F 15/02
[52] U.S. Cl. .............................................................. 395/824
[58] Field of Search ................................. 371/2.1, 2.2, 3,
371/37.1, 37.2, 37.7, 40.1, 40.4, 48, 49.1–49.4,
50.1, 51.1, 53, 67.1; 395/185.01, 185.02,
185.03, 185.04, 185.05, 824, 829, 846,
182.04, 800

[56] References Cited

U.S. PATENT DOCUMENTS

| | | | |
|---|---|---|---|
| 4,484,272 | 11/1984 | Green | 395/706 |
| 5,144,573 | 9/1992 | Greiver | 364/738 |
| 5,155,698 | 10/1992 | Niimi | 364/715.08 |
| 5,404,548 | 4/1995 | Nishioka | 395/800 |
| 5,426,735 | 6/1995 | Shibata et al. | 395/200.17 |

FOREIGN PATENT DOCUMENTS

| | | |
|---|---|---|
| 198630 | 10/1986 | European Pat. Off. |
| 2220540 | 1/1990 | United Kingdom . |
| 2231471 | 11/1990 | United Kingdom . |
| 2252481 | 8/1992 | United Kingdom . |
| 2256109 | 11/1992 | United Kingdom . |

OTHER PUBLICATIONS

Treatise presented in Autumn 1992 Meeting of Institute of Electronics and Communication Engineers of Japan, *High Speed, Performance Three–Dimensional CG System*, Subaru, 7 pages.

Treatise in *Nikkei Electronics*, Apr. 4, 1993 (No. 578), pp. 148–154.

*Primary Examiner*—Moustafa M. Meky
*Attorney, Agent, or Firm*—Staas & Halsey

[57] ABSTRACT

Data is transferred via FIFO memories on a word unit basis. The FIFO memory is designated by an upper bit portion of a write address. An ID bit indicating whether a transfer word indicates a command or parameters is allocated to a lower bit portion and is written into the FIFO memory together with inherent word data. Upon reading, a lower bit portion of a read address is compared with the ID bit read out from the FIFO memory. When they don't coincide, the presence of an error is decided. In case of adding redundant bits to the transfer word and judging a loss of word, on the transmission side, transmission side judgment bits having a fixed bit arrangement 01 of two bits are added to each word. Further, with respect to the m-th word, the transmission side judgment bits are shifted by (m–1) bits and a bit arrangement is changed and the resultant data is transmitted. On the reception side, the transmission side judgment bits are reversely shifted to the original positions and three bits in which one bit adjacent to the transmission side judgment bits was added thereto are checked. When a bit arrangement of the reception side judgment bits corresponding to the transmission side judgment bits coincides with a bit arrangement of the transmission side judgment bits, it is determined that there is no word loss. When they don't coincide, it is decided that there is a word loss.

18 Claims, 30 Drawing Sheets

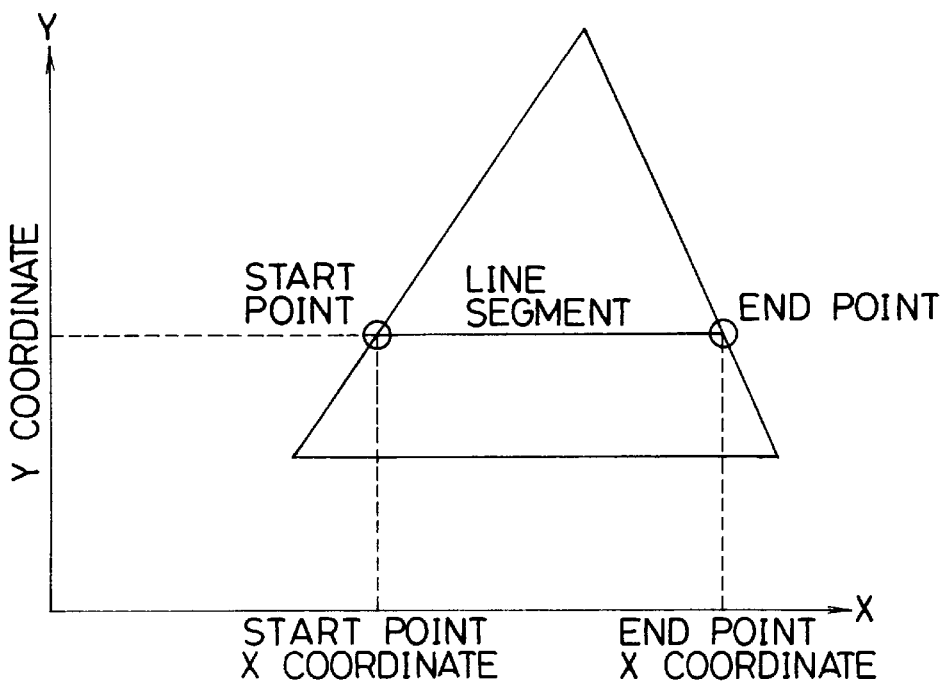

FIG. 4A
PRIOR ART
FIG. 4B
PRIOR ART
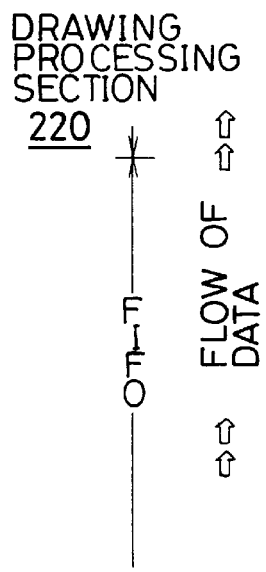
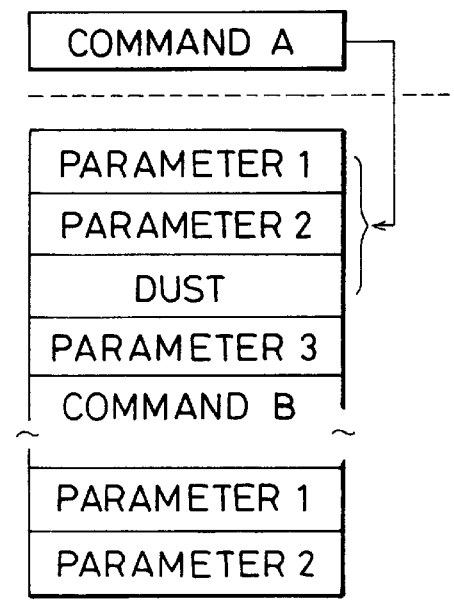

FIG.6
PRIOR ART

| BIT 31 | 30 | COMMAND/PARAMETER 16 15 | BIT 0 |
|---|---|---|---|
| | 1 | COMMAND (15 BITS) | X COODINATE (16 BITS) |
| | 0 | START POINT X COORDINATE (15 BITS) | END POINT X COORDINATE (16 BITS) |
| | 0 | LINE SEGMENT START POINT Z VALUE (DEPTH) (31 BITS) | |
| | 0 | LINE SEGMENT START POINT R VALUE (RED DENSITY) (31 BITS) | |
| | 0 | LINE SEGMENT START POINT G VALUE (GREEN DENSITY) (31 BITS) | |
| | 0 | LINE SEGMENT START POINT B VALUE (BLUE DENSITY) (31 BITS) | |
| | 0 | LNIE SEGMENT Z VALUE INCREASED AMOUNT (31 BITS) | |
| | 0 | LINE SEGMENT R VALUE INCREASED AMOUNT (31 BITS) | |
| | 0 | LINE SEGMENT G VALUE INCREASED AMOUNT (31 BITS) | |
| | 0 | LINE SEGMENT B VALUE INCREASED AMOUNT (31 BITS) | |

FIG.32

| CHECK BIT | FACTOR OF ABNOMALITY |
|---|---|
| 0 0 0 | 0 FIXED FAILURE |
| X 0 1 | NORMAL OPERATION |
| 0 1 X | 1 WORD LOST |
| 1 X X | 2 OR MORE WORDS LOST |
| 1 1 1 | 1 FIXED FAILURE |

SYSTEM FOR JUDGING READ OUT TRANSFER WORD IS CORRECT BY COMPARING FLAG OF TRANSFER WORD AND LOWER BIT PORTION OF READ DESTINATION SELECTION ADDRESS

BACKGROUND OF THE INVENTION

The present invention relates to data transfer apparatus and method in which data which was processed in parallel is distributed and transferred to other parallel units at a high speed via FIFO memories and, more particularly, to data transfer apparatus and method for detecting errors when drawing data which was processed in parallel by a three-dimensional graphics apparatus or the like is distributed and transferred at a high speed via FIFO memories.

In the 3-dimensional graphics display apparatus, to execute processes at a high speed, the processing stage is divided into a figure process by a software and a drawing process by a hardware and the processes are, further, executed in parallel. When there is an error in the result of the figure process by the software, however, the drawing process is not correctly performed, so that there is a case where the apparatus enters a runaway state and not only no data can be displayed but also the occurrence of an abnormality cannot be recognized. It is required to avoid such a situation as much as possible.

FIG. 1 schematically shows a conventional 3-dimensional graphics display apparatus. A figure processing section 200 executes geometrical conversion such as coordinates calculation, clipping, color calculation, and the like, drawing pre-processes of formation of line segments, and drawing processes such as line segment drawing and hidden image erasure to figure data constructing a three-dimensional model that is obtained from a memory 202 and comprises a set of polygons, thereby forming 3-dimensional image data when it is seen from a visual point. The figure processing section 200 executes in parallel the geometrical conversion, drawing pre-processes, and drawing processes to the figure data by a pipeline construction. The drawing data obtained in parallel by such a series of figure processes is transferred in parallel to a drawing processing section 220 through a parallel distributing mechanism which is constructed by input FIFO memories 214-1 to 214-n, an input/output (I/O) selecting section 216, and output FIFO units 218-1 to 218-n. On the basis of the drawing data transferred, the drawing processing section 220 executes in parallel interpolating calculations of pixels which are arranged between the start point and the end point of a line segment and performs a mapping process into a frame buffer 222. After completion of the mapping process, image data is displayed on a CRT 224 or the like.

FIG. 2 shows 2-dimensional drawing data indicative of a triangular polygon in a 3-dimensional space. Since the triangular polygon constructing a 3-dimensional model is a set of vertex data, it is expressed as a set of line segment data (span data) in the direction of an X axis by processes by the figure processing section 200 as shown in FIG. 3. Each span data is expressed by a set of a command and parameters. In this case, a fact that a line is a line segment is indicated by a command ID. A Y coordinate of the line segment, X coordinates of the start point and end point, a position (depth) in the direction of a Z axis of the start point, a concentration of each color of red, green, and blue at the start point, and an increased amount value per one pixel which is developed on the line segment by an interpolating calculation are shown as parameters. One unit which is data transferred is defined as one word. One word consists of, for example, 32 bits. The line segment data consists of, for instance, 10 words.

The figure processing section 200 in FIG. 1 obtains in parallel the line segment data including a command and parameters shown in FIG. 3 on a polygon unit basis and transfers to the drawing processing section 220 through a parallel data distributing mechanism using FIFO memories. The drawing processing section 220 must correctly extract the command and parameters from the transferred drawing data. FIGS. 4A and 5A show the case where data has correctly been transferred to the drawing processing section 220. Since the first word that is taken out from the FIFO memory on the output side includes the command ID, it is interpreted as a command A. In this case, as for a format of the data subsequent to the command A, since it will be understood that three parameter words continue, data is set into necessary registers while sequentially accepting parameters 1, 2, and 3. After the necessary number of parameters were received, it is possible to decide that the data to be read next is a command B. A format in which the number of parameters subsequent to the command is previously included in the command word is also considered. The drawing processing section 220 first receives the command and interprets a part of the command and counts the number of read data while setting the subsequent parameters into the necessary registers. When the designated number of parameters coincides with the count value, it is possible to recognize that the next data is a command. In a manner similar to the above, the drawing processing section 220 sequentially discriminates the command and the parameters subsequent to them and writes the data into the registers and performs the drawing process by interpolating calculations.

FIGS. 4B and 5B show the case where an abnormality occurred in a part of the transfer data due to some reasons. First, in FIG. 4B, surplus dust data is added between the parameter 1 subsequent to the command A and the parameter 3. Since the command A ought to have three parameters, the drawing processing section 220 interprets the parameters 1 and 2 and the dust as parameters and finishes the processes of the command A. The drawing processing section 220 interprets the parameter 3 as a next command. In FIG. 5B, the command A is deformed and changed to another command X. For example, when it is now assumed that the parameters of the command X have four words, the drawing processing section interprets that the commands up to the command word of the next command B as parameters. The parameter 1 of the command B is interpreted as a next command.

Now, assuming that the portions of the parameters were merely changed, a part of the line segment of the triangular polygon is merely lost. Therefore, such a state doesn't cause a large problem from a viewpoint of the image display. However, in the case where an abnormality occurred in the command portion as shown in FIGS. 4B and 5B, the subsequent data train cannot be interpreted. What is called a runaway state of the drawing processing section 220 such that it is also difficult to recover the drawing operation occurs. Such an abnormality of the transfer data mainly occurs due to a program error of the figure processing section 200 at the front stage. In this case, however, the processor of the figure processing section 200 cannot recognize such an abnormality and cannot execute an error recovering process.

On the other hand, so long as the apparatus has a function to separate the command portion on the side of the drawing processing section 220, the abnormality can be recognized.

An error can be notified to the figure processing section 200. Further, the drawing process can be again executed. FIG. 6 shows an example of a data format in which the command and parameters of the transfer data can be discriminated on the side of the drawing processing section 220. The most significant bit of each word is allocated to an ID bit. In case of a command, the most significant bit (MSB) is set to 1. In case of a parameter, the MSB is set to 0. However, in the case where a special bit in one word is allocated as a bit to distinguish the command and the parameters, there is a drawback such that an amount of information which can be expressed by the command and parameters is limited.

On the other hand, in general, there is a possibility such that errors certainly occur in data due to the existence of a transfer medium in not only the 3-dimensional graphics display apparatus but also the transfer of digital data. Therefore, there is used a method whereby redundant code bits having a regularity are ordinarily added to data to be transferred, such a regularity is checked on the reception side, and when there is an abnormality in the regularity, it is decided that the transfer data includes an error, and a retransfer is requested to the transferring side.

Hitherto, as a method of detecting an error of the transfer data in a data bus, a method by a parity check as shown in FIG. 7 is generally known. That is, parity bits are added in accordance with a rule such that the total number of bits 1 included in the word to be transferred on the data transmission side is set to an even number. On the reception side, the parity bits are compared with the parity bits produced from the transferred word. When they don't coincide, it is decided that the transfer data is wrong. On the other hand, there is also a method whereby in the case where the total number of data 1 on the reception side is merely equal to an odd number, it is decided that the transfer data is wrong.

However, according to the bit error detection by the parity as mentioned above, although a bit error in one word can be detected, a loss of the word itself cannot be detected. FIG. 8 shows the case where one transfer group is constructed by six words and it is continuously transferred on a word unit basis. Parity bits are respectively added to six words on the data transmission side. For example, it is now assumed that the fourth word was lost on the reception side due to a trouble of the signal to control the transfer of the data bus. However, in this case, since it is determined that all of the parity bits are correct, the loss of word cannot be detected.

FIG. 9 shows a 2-dimensional data error detecting method whereby in order to detect the loss of data word, as well as the addition of the parity bits to each word, data indicative of the number of words to be transferred since now is added. That is, upper four bits of each word denotes the additional data to decide a communicating procedure to indicate the number of subsequent words or the command transfer data. Remaining lower four bits indicate the number of transfer words or the data. For example, all of the upper four bits of the first word are equal to 1, the first word indicates the additional data indicative of the number of words and shows that the number of subsequent transfer words is equal to 3 because it is expressed by 0011 as a binary number. In the three second to fourth words, all of the upper four bits are equal to 0 and the remaining four bits indicate the data to be inherently transferred. The parity bit is respectively added to each word.

FIG. 9 shows the case where the fourth word is lost on the reception side. In this case, the number of transfer words (=3) designated by the additional data of the first word doesn't coincide with the number of words up to the additional data indicative of the number of next transfer words. Therefore, it is decided that there is an error in the transfer data. As an inserting method of the additional data, there is also a method whereby data of a bit pattern in which a probability of occurrence is low is inserted once a predetermined number of times.

As another error detecting method regarding the loss of word itself, as shown in FIG. 10, there is also a method whereby the word numbers are also simultaneously transmitted. According to this method, for instance, the word number of three bits is added to each word and transmitted and a continuity of the word numbers is checked on the reception side, thereby knowing a loss of data. In FIG. 10, it will be understood on the reception side that the fourth word as a word number 100 was lost.

According to the conventional error detection by the parity check, however, it is an object to detect a bit error regarding one word to be transferred and the loss of word itself cannot be known. On the other hand, according to a method of deciding a communicating procedure that is effective to detection of the loss of word itself, in the case where the data is out of the rule of a predetermined procedure, an error can be certainly detected. However, large amount of vain transfer data for such a detection is needed. The above method is unsuitable to a high-speed data transfer circuit. Although the method of simultaneously transferring the word number is the most certain method, in case of applying such a method to the error detection of the data transfer on the data bus, a large number of transmission bits of the bus are necessary.

SUMMARY OF THE INVENTION

According to the present invention, there is provided a data transfer apparatus in which the kind of word regarding whether it indicates a command or parameters can be recognized on the transfer destination side without executing any special operation to transfer data on the transferring side and at least an error of the transfer data can be recognized.

According to the data transfer apparatus of the invention, data is transferred via FIFO memories on a word unit basis while setting a predetermined bit length into one word. The data transfer apparatus is constructed by: a first processing apparatus as a transferring side; a second processing apparatus as a transfer destination; FIFO memories; a memory write control section; a memory read control section; and a judgment section. The first processing apparatus designates an FIFO memory as a write destination of the transfer word by an upper bit portion of a write destination selection address, designates the kind of transfer word, namely, whether it indicates a command or parameters by a lower bit portion of the write destination selection address, and requests the writing operation of the transfer word. The second processing apparatus designates an FIFO memory as a read destination of the transfer word by an upper bit portion of a read destination selection address and designates the kind of transfer data, namely, whether it indicates a command or parameters by a lower bit portion of a read destination selection address, and requests the reading operation of the transfer data. In the FIFO memory, one word memory area is constructed by the portion to store the inherent transfer word and the portion to store the additional data, and the data is stored into each word memory area in a FIFO manner (by a first-in and first-out method). When there is a write request from the first processing apparatus, the memory write control section interprets the upper bit portion of the write destination selection address. When a selection signal is made effective, the lower bit portion of the write destination selection address is added to the transfer word as an ID flag indicating whether the transfer word indicates a command or parameters and writes into the selected FIFO memory. When there is a read request from the second processing apparatus, the read control section interprets the upper bit portion of a read destination selection address. When the selection signal is made effective, the transfer word is read out from the selected FIFO memory together with the ID flag. The judging section compares the ID flag read out by the read control section and the lower bit portion of the read destination selection address from the second processing apparatus and judges whether the read-out transfer word is proper or improper. When they don't coincide, the occurrence of a transfer error is notified.

In the case where the drawing data obtained in parallel is stored into a plurality of FIFO memories and either one of the FIFO memories is selected and the stored drawing data is read out therefrom and transferred, a plurality of sets each comprising the first processing apparatus as a figure processor, FIFO memories, write control section, and read control section are provided. One second processing apparatus for read transfer is provided as a common unit. Parallel writing operations of the transfer word are requested to the corresponding FIFO memories by a plurality of first processing apparatus. Either one of a plurality of FIFO memory stages is selected by one second processing apparatus and the reading operation of the transfer word is requested.

In the case where either one of a plurality of output FIFO units is selected and the transfer word which has been written and transferred is read out and transferred in parallel, a plurality of sets each comprising the second processing apparatus as a drawing processor, FIFO memories, write control section, read control section, and judging section are provided and one first processing apparatus as a transferring side is provided as a common unit. Either one of a plurality of FIFO memories is selected by one first processing apparatus and a writing operation is requested. The parallel reading operations of the transfer word are requested to the corresponding FIFO memories by a plurality of second processing apparatuses as drawing processors.

The first processing apparatus to request the transfer writing operation generates the same write destination selection address each time there is a write request of the transfer word which belongs to the same group, in which a predetermined number of words is set to one group. Similarly, the second processing apparatus which requests the transfer reading operation also generates the same read destination selection address each time there is a read request of the transfer word which belongs to the same group while setting a predetermined number of words to one group. The transfer words of one group includes, for example, the command in the head word and the remaining words are constructed by the parameters which are used in the processes based on the command. The lower bit portion of the write destination selection address or read destination selection address is set to an ID flag to discriminate whether the transfer data of one word indicates a command or parameters. Specifically speaking, the transfer word of one group is constructed by, for instance, a drawing instructing command and drawing parameters. Further, the drawing parameters are constructed by: 3-dimensional coordinate values of the start point and end point of a line segment; each color value of the start point and end point of the line segment; and increased amount values to interpolate the pixels from the start point of the line segment to the end point.

In a modification of the invention, as a read control section, when a first selection signal in which the upper bit portion of the read destination selection address and the lower bit portion having a value to designate the kind of word to be read out were together interpreted is made effective upon reading by the second processing apparatus, only the ID flag is read out from the FIFO memory means. When a second selection signal in which the upper bit portion of the read destination selection address and the lower bit portion having a value to designate the reading operation of the transfer data were together interpreted is made effective, only the transfer word can be read out from the FIFO memory. The ID flag read out by the read control section is compared with the lower bit portion of the read destination selection address which has designated the reading operation of the ID flag by the judging section, thereby discriminating whether the transfer word is proper or improper. The value of the lower bit portion of the read selection address to designate the reading operation of the ID falg is set to an odd number and the value of the lower bit portion to designate the reading operation of the transfer word is set to an even number and vice versa. Further, when the read-out ID flag doesn't coincide with the lower bit portion of the read destination selection address, the reading operation is sequentially executed for the word memory areas of the FIFO memories until the ID flag which coincides with the lower bit portion is obtained. The transfer word in the word memory area in which the ID flag coincides with the lower bit portion is read out.

According to the data transfer apparatus of the invention as mentioned above, the address decoding to select the FIFO memory by using only the upper bit portion of the address bits is performed. Due to this, the lower bit portion of the address bit can be allocated to the ID flag. Therefore, as an address bit to select the FIFO memory at the time of write transfer or read transfer, the FIFO memory is selected and designated by only the upper bit portion. With respect to the lower bit portion, an ID bit indicative of the kind regarding whether the transfer word indicates the command or parameters is generated.

When the transfer word is written into the FIFO memory, the FIFO memory is selected and designated by decoding the upper bit portion of the address bits. At the same time, the lower bit portion of the address bits is added as an ID flag to the inherent transfer word and written into the FIFO memory. When the transfer word is read out from the FIFO memory, the FIFO memory is selected and designated by the address upper bit portion, so that the transfer word to which the ID flag was added is read out from the FIFO memory. When the transfer word is checked, the address lower bit portion used for the reading operation is compared with the read-out ID flag. When they coincide, it is decided that the transfer word is correct. When they don't coincide, it is determined that there is a transfer error, so that the error process can be executed.

According to the invention, there are provided a transfer data apparatus and method in which the number of redundant bits which are added to inherent transfer data can be minimized and a loss of the transfer word itself can be detected.

In the data transfer apparatus in which the redundant bits are added, the data is transferred on a word unit basis while a predetermined number of bits is set to one word. A predetermined number of words are first inputted as one transfer group. Transmission side judgment bits of two bits in which different values have fixedly been decided are added to each word constructing one group. The transmission side judgment bits added to each word are subsequently shifted in a predetermined direction by only (m−1) bits for the mth word, thereby forming the transfer word. The transfer word (=word data + transmission side judgment bits) formed as mentioned above is continuously transferred by an amount of only one group. In this instance, the data is transferred, for example, via the FIFO memories. For each of the transfer words of one group held on the reception side, the mth transfer word is shifted by only (m−1) bits in the direction opposite to the shifting direction of the transmission side judgment bits, thereby returning the transmission side judgment bits to the original position. After completion of the reverse shift, reception side judgment bits (three bits) comprising two bits at the position of the transmission side judgment bits of each transfer word and one bit adjacent to those two bits are checked, thereby detecting the presence or absence of the loss of transfer word.

When the transmission side judgment bits corresponding to the reception side judgment bits coincide with the bit arrangement of the transmission side judgment bits, it is determined that there is no loss of transfer word. When the reception side judgment bits corresponding to the transmission side judgment bits differ from the bit arrangement of the transmission side judgment bits, it is decided that there is a loss of transfer word. When it is determined that there is a loss of transfer word, the retransmission is requested to the data transmitting source or a signal indicating that the transfer data cannot be recovered is sent. In the detection of a transfer error, when the reception side judgment bits are deviated by one bit from the transmission side judgment bits, it is decided that there is a loss of one word. When the reception side judgment bits are deviated by two bits from the transmission side judgment bits, it is decided that there is a loss of two-word abnormality. When all of the reception side judgment bits are equal to 1, it is decided that there is a hardware failure in which all of the bits of one word are fixed to 1. Further, when all of the reception side judgment bits are equal to 0, it is determined that there is a hardware failure in which all of the bits of one word are fixed to 0. The bit error detection by using the parity bits can be also obviously used in the error detection by the transmission side judgment bits.

The above and other objects, features, and advantages of the present invention will become more apparent from the following detailed description with reference to the drawings.

BRIEF DESCRIPTION OF THE DRAWINGS

FIG. 2 is an explanatory diagram showing the production of drawing data on a polygon unit basis by a figure processing section;

FIG. 3 is an explanatory diagram of line segment data which is formed on a polygon unit basis and word data constructing the line segment data;

FIG. 4A is an explanatory diagram showing a normal data transfer;

FIG. 4B is an explanatory diagram showing a transfer of abnormal data added with dust data;

FIG. 6 is an explanatory diagram of a conventional data format in which ID bits are allocated to transfer data itself;

FIG. 32 is an explanatory diagram showing error judgment references by reception judgment bits.

DETAILED DESCRIPTION OF THE PREFERRED EMBODIMENT

Figure 1:
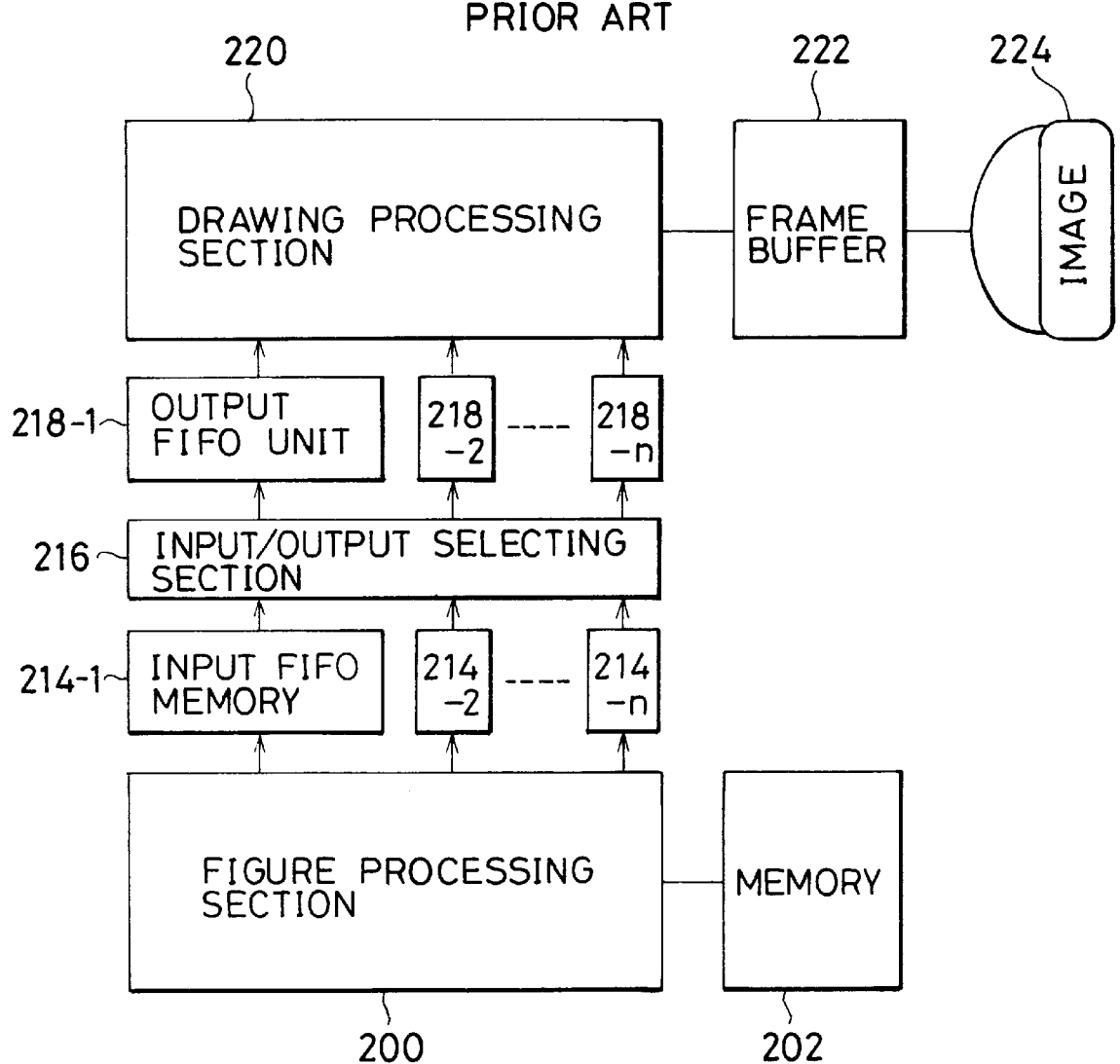
FIG. 1 is a block diagram showing schematically a conventional apparatus.
Figures 5A, 5B:
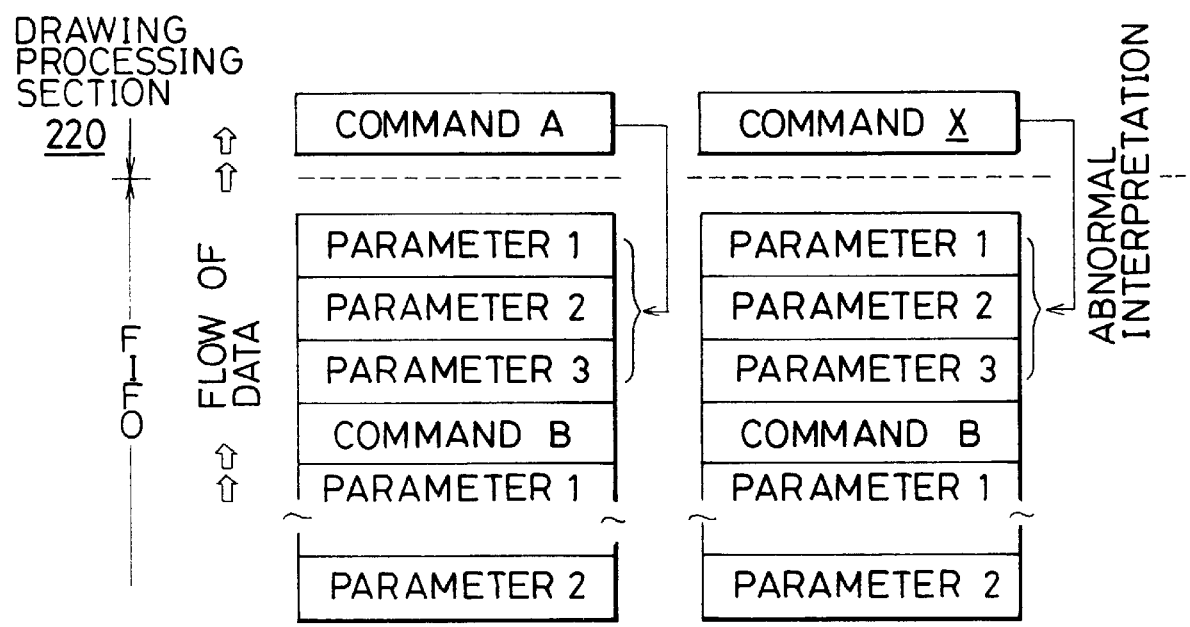
FIG. 5A is an explanatory diagram showing a normal data transfer.
FIG. 5B is an explanatory diagram showing a transfer of abnormal data in which a command is changed.
Figure 7:
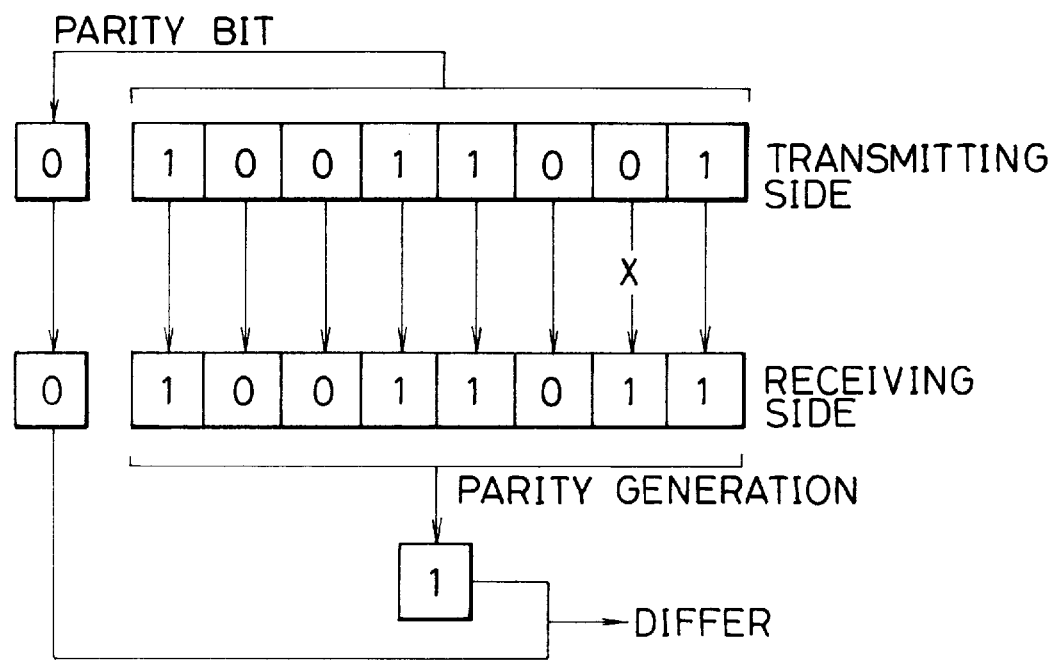
FIG. 7 is an explanatory diagram showing a conventional parity checking method.
Figure 8:
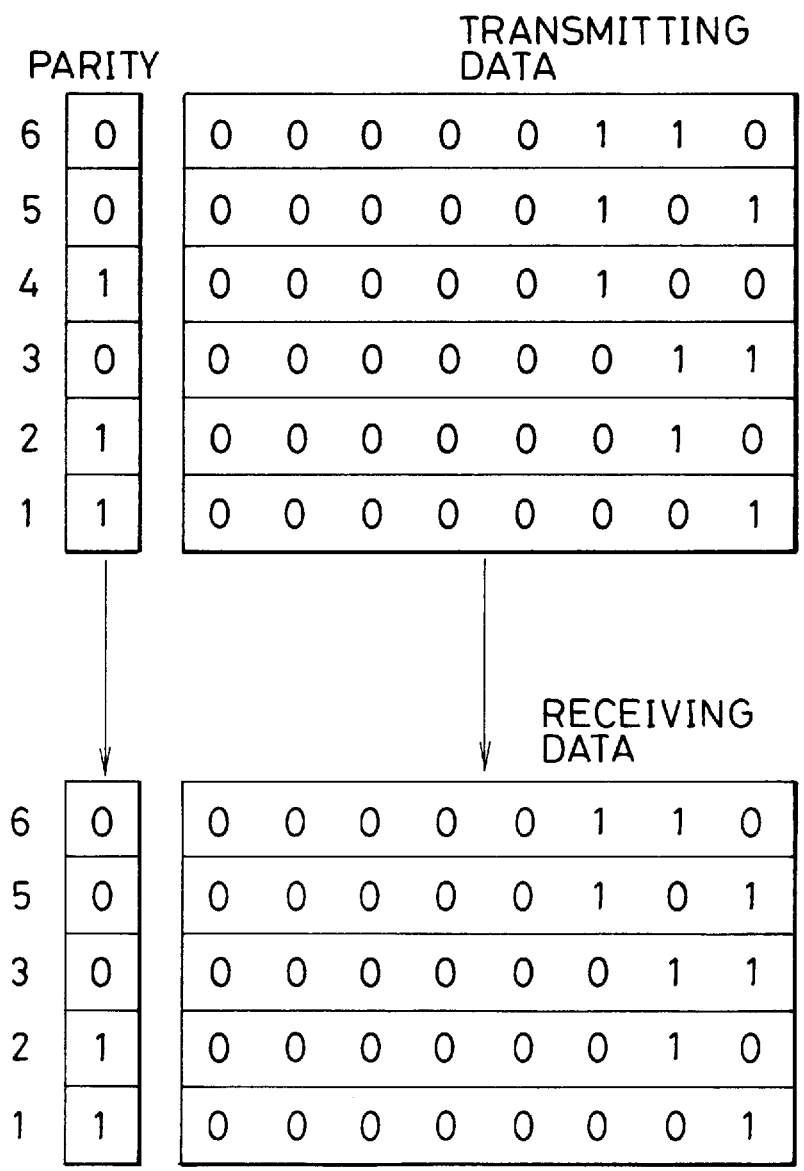
FIG. 8 is an explanatory diagram showing an example of a loss of word which cannot be detected by the parity checking method.
Figure 9:
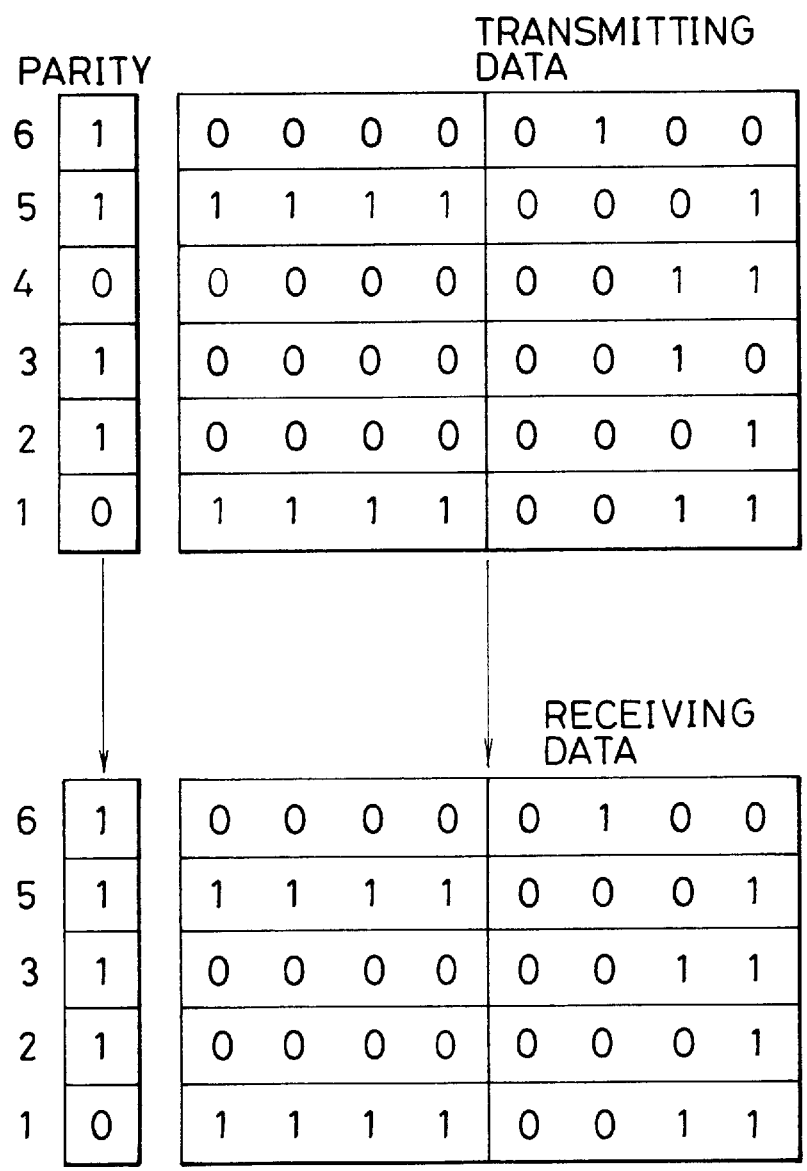
FIG. 9 is an explanatory diagram of a conventional method of detecting a conventional word loss.
Figure 10:
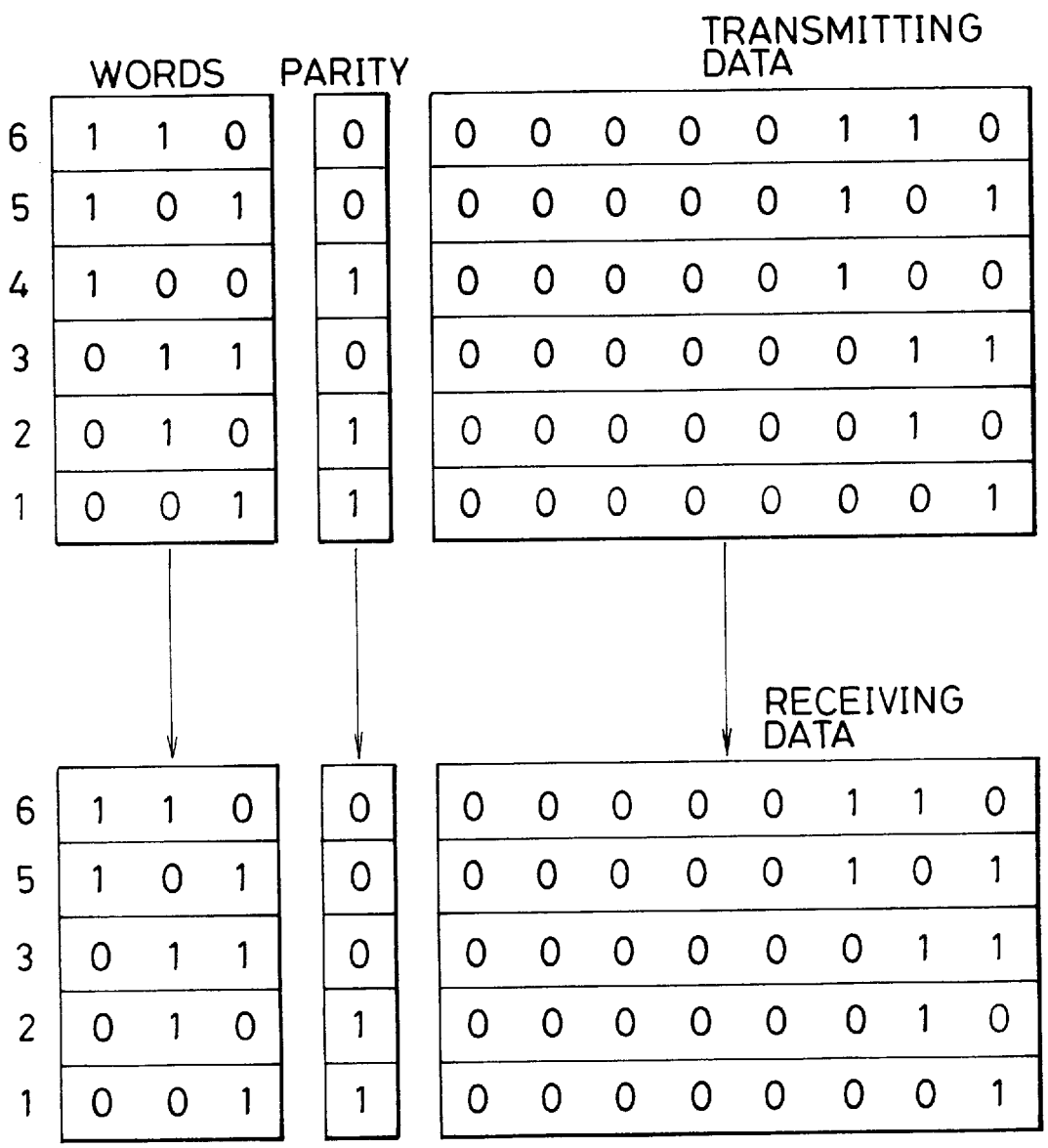
FIG. 10 is an explanatory diagram of a conventional method for detecting a word loss by adding the word number.
Figure 11:
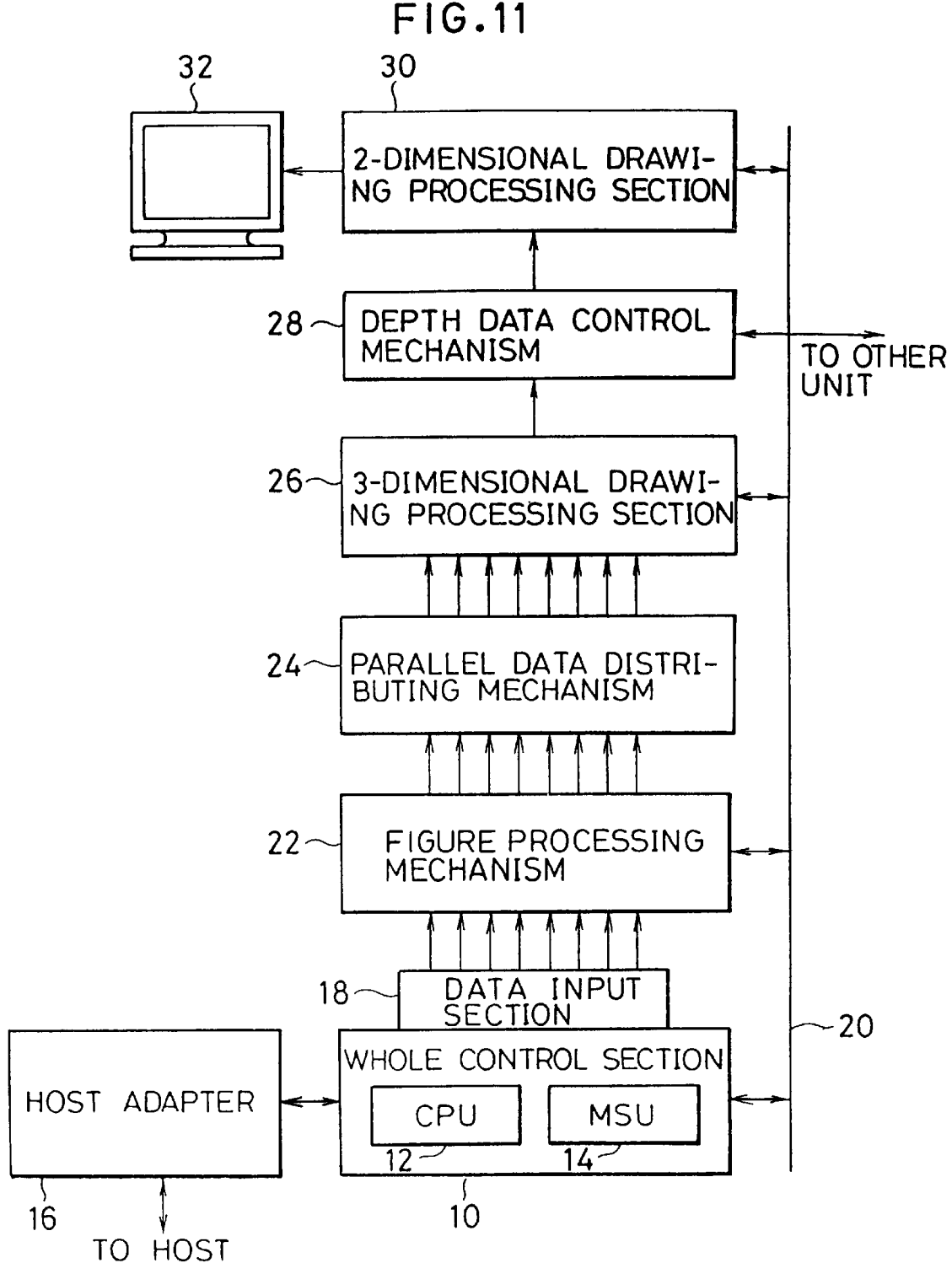
FIG. 11 is a block diagram of a 3-dimensional graphics apparatus to which the present invention is applied.

FIG. 11 is a block diagram showing a construction of one unit of a 3-dimensional drawing system in which a data transfer apparatus using FIFO memories of the present invention is used. A plurality of such units are provided as necessary. A whole control section 10 has a CPU 12 and a main storage unit (MSU) 14. The whole control section 10 is coupled with a host computer through a host adapter 16. A drawing command and figure data indicative of a 3-dimensional object are supplied from the host computer to the whole control section 10 through the host adapter 16. Subsequent to the whole control section 10, a figure processing mechanism 22 is provided through a data input section 18. In the embodiment, the figure processing mechanism 22 has 32 digital signal processors and constructs eight parallel pipelines or a 5-dimensional hypercube and executes arithmetic operations of figure processes in parallel. Namely, eight pipelines of the figure processing mechanism 22 set a visual point and a light source for the figure data comprising a set of pixels constructing a 3-dimensional model and executes geographic conversion such as coordinates calculation, clipping, color calculation, and the like and line segment formation as a drawing pre-process by a program control based on a software, thereby developing into line segment data (span data) of every pixel. Eight results of the arithmetic operations of the figure processing mechanism 22 are sent to a 3-dimensional drawing processing mechanism 26 through a parallel data distributing mechanism 24. The parallel data distributing mechanism 24 has a data transfer apparatus using FIFO memories of the present invention. The drawing data which is asynchronously produced by eight parallel pipelines of the figure processing mechanism 22 is distributed and transferred at a high speed to the 3-dimensional drawing processing mechanism 26 at the next stage. The 3-dimensional drawing processing mechanism 26 receives the drawing data developed into the span data of every polygon and obtains the pixels which are arranged between the start point and end point of the line segment by interpolating calculations, thereby mapping into a 3-dimensional frame memory. Further, the 3-dimensional drawing processing mechanism 26 executes a blending of each pixel, hidden image erasure, or the like, thereby mapping into the 3-dimensional frame memory. The data drawn in the 3-dimensional frame memory of the 3-dimensional drawing processing mechanism 26 is transferred to a 2-dimensional drawing processing section 30 through a depth data control mechanism 28 and is displayed as 2-dimensional image data onto a color display 32. Further, the figure processing mechanism 22, 3-dimensional drawing processing mechanism 26, and 2-dimensional drawing processing section 30 are connected to the whole control section 10 through a system bus 20 and the drawing data is managed by the whole control section 10.

Figure 12:
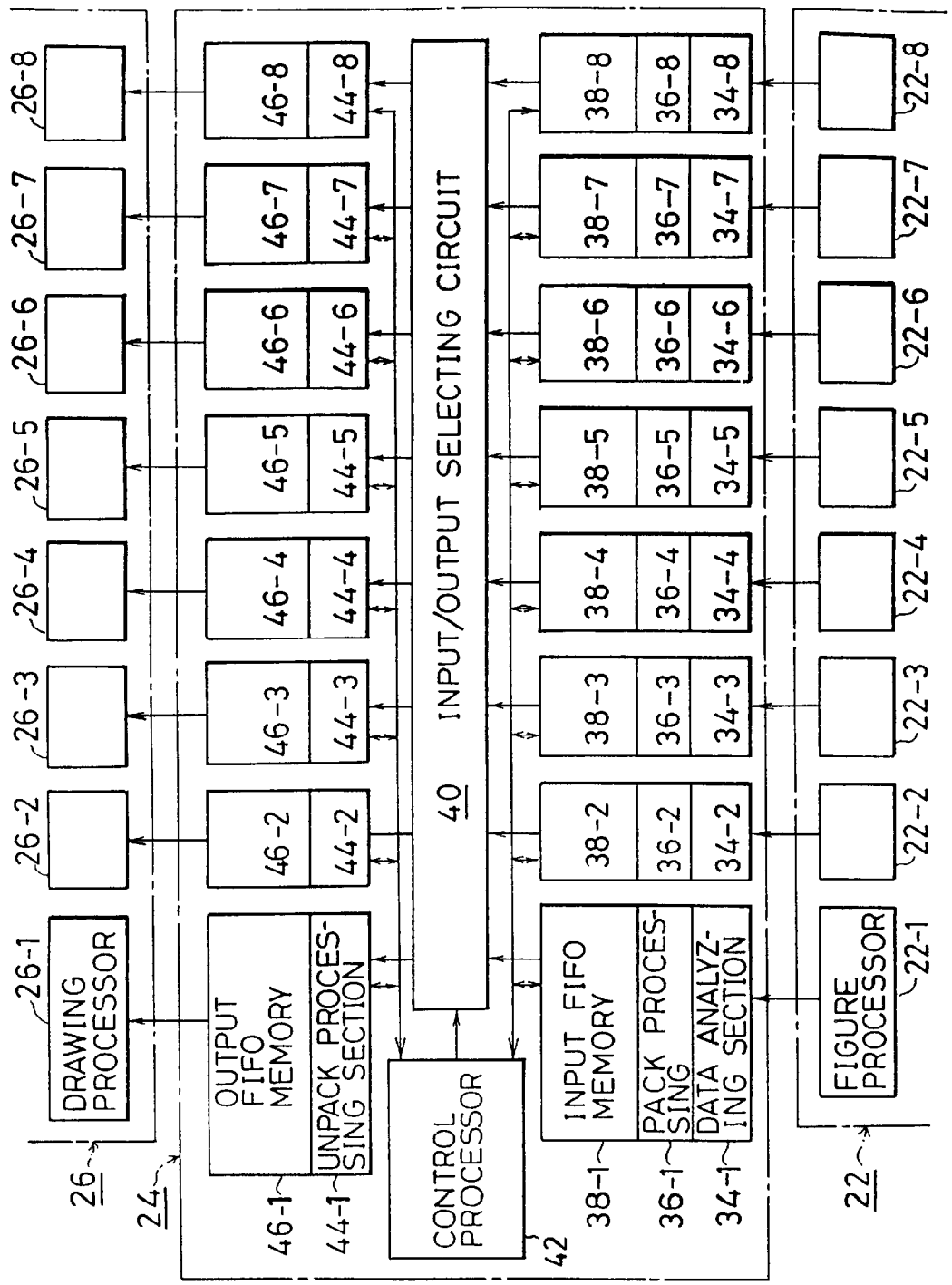
FIG. 12 is a block diagram showing the details of a parallel data distributing mechanism using FIFO memories in FIG. 11.

FIG. 12 shows an embodiment of the parallel data distributing mechanism 24 of FIG. 11. First, the figure processing mechanism 22 has eight figure processors 22-1 to 22-8. The figure processors 22-1 to 22-8 function as a DSP constructing the final stage of the eight parallel pipelines. Data analyzing sections 34-1 to 34-8, pack processing sections 36-1 to 36-8, and input FIFO memories 38-1 to 38-8 are provided on the input side of the parallel data distributing mechanism 24. Subsequently, an input/output (I/O) selecting circuit 40 which is controlled by a control processor 42 is provided. Further, unpack processing sections 44-1 to 44-8 and output FIFO memories 46-1 to 46-8 are provided on the output side. Drawing processors 26-1 to 26-8 are provided on the side of the 3-dimensional drawing processing mechanism 26.

Figure 13:
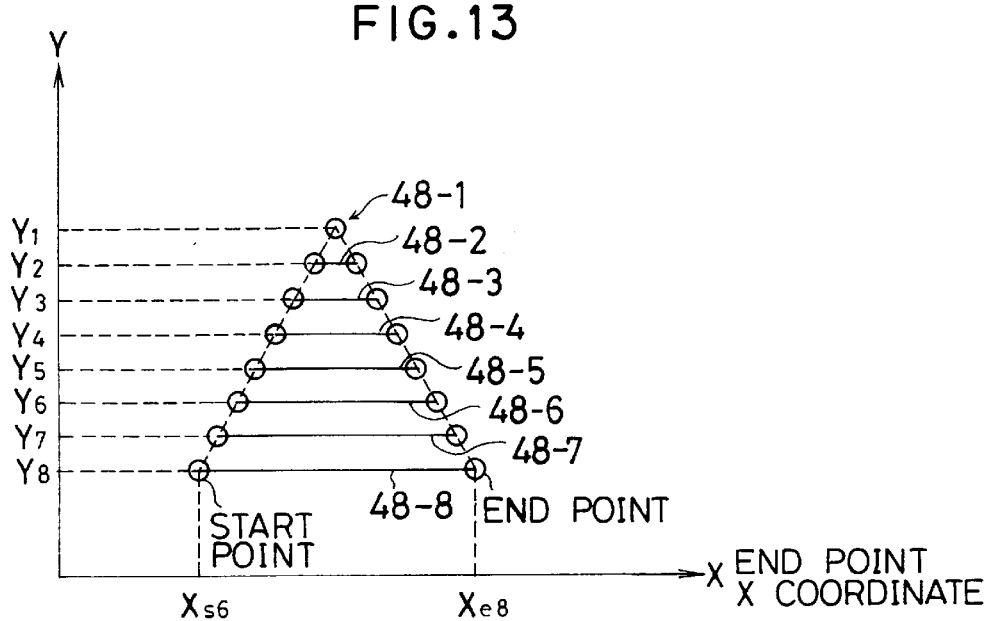
FIG. 13 is an explanatory diagram showing the production of drawing data by a figure processing mechanism in FIG. 11 with respect to one pixel.
Figure 14:
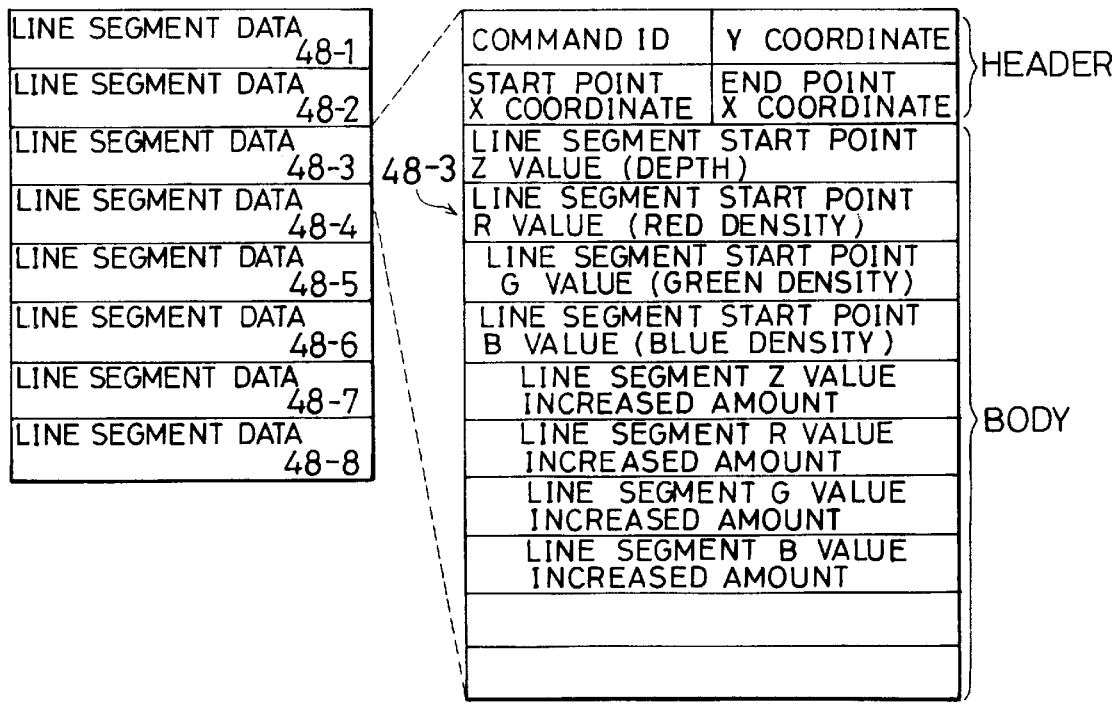
FIG. 14 is an explanatory diagram showing line segment data of one pixel and its word construction.

A format of the drawing data which is handled by the parallel data distributing mechanism 24 using FIFO memories will now be described. FIG. 13 shows span data constructing one polygon which is obtained by each pipeline of the figure processing mechanism 22. In the embodiment, a triangular polygon is used. Since only information regarding the vertexes of the triangular polygon is inputted from the whole control section 10, in each pipeline of the figure processing mechanism 22, it is developed into the span data in the Y direction on an XY display screen shown in FIG. 13. In the 3-dimensional drawing processing mechanism 26 shown in FIG. 11, since the pixels are written in parallel into eight lines in the X-axis direction (horizontal direction) of the frame memory which is addressed by XY coordinate values, one triangular polygon is divided into eight span data 48-1 to 48-8 having eight Y coordinate values $Y_1$ to $Y_8$ as shown in FIG. 13. The span data 48-1 to 48-8 of one pixel shown in FIG. 14 are combined to one transfer unit. One span data is constructed by 12 words each consisting of 32 bits. That is, first one word constructs a header including the command ID and Y coordinate value and the remaining eleven words construct a body in which parameters to specify the span data have been stored. A start point X coordinate value of a line segment, an end point X coordinate value, a line segment start point Z value, a line segment start point R value, a line segment start point G value, a line segment start point B value, a line segment Z value increased amount, a line segment R value increased amount, a line segment G value increased amount, and a line segment B value increased amount are stored in the body. In the embodiment, although the remaining two words are not used, proper parameters are stored as necessary. The command ID stored in the upper bits of the header indicates that the packet data is span data. The Y coordinate value of the lower bits of the header subsequent to the command ID indicates the position of the line segment in the Y axis direction shown in FIG. 13. In the invention, either one of the output FIFO memories 46-1 to 46-8 is selected as a transfer destination by using lower three bits of the Y coordinate value. The parameters stored in the body portion are used for the linear interpolating calculations of the R, G, B, and Z values in the 3-dimensional drawing processing mechanism 26.

Processing operations for data distribution in FIG. 12 will now be described. The figure processors 22-1 to 22-8 in the figure processing mechanism 22 calculate data of eight line segments per one polygon shown in FIGS. 13 and 14 by eight parallel pipeline processes, respectively. Each span data is constructed by 12 words. The eight span data of one pixel which has been calculated in parallel by the figure processors 22-1 to 22-8 is transferred and written into the input FIFO memories 38-1 to 38-8 of the data distributing mechanism 24, respectively. Each time the span data is written into the input FIFO memories 38-1 to 38-8, it is analyzed by the data analyzing sections 34-1 to 34-8. After completion of the writing operation of one span data, the pack processing section 36-1 is activated and a packing process to separately transfer one span data comprising 12 words in parallel on a unit basis of every six words (192-bit parallel) is executed. The control processor 42 transfers the 6-word parallel data (192-bit parallel data) which has been packed in either one of the input FIFO memories whose transfer preparation has been completed to either one of the output FIFO memories 46-1 to 46-8 which is designated by lower three bits of the Y coordinate value of the header through the I/O selecting circuit 40. The unpack processing sections 44-1 to 44-8 are provided for the input stages of the output FIFO memories 46-1 to 46-8, respectively. The unpack processing sections 44-1 to 44-8 separate the 6-word parallel data transferred from the I/O selecting circuit 40 into each word unit and write into the self output FIFO memories 46-1 to 46-8, respectively. After completion of the data transfer of one polygon, the data transfer by the parallel reading operations is executed from the output FIFO memories 46-1 to 46-8 to the drawing processors 26-1 to 26-8 of the drawing processing mechanism 26. After completion of the eight parallel data reading and transferring operations, among the eight span data obtained with respect to the next polygon, the data is distributed and transferred from the input FIFO memory to the output FIFO memory in accordance with the order from the span data whose transfer preparation has been completed. The span data calculated in parallel by eight pipelines of the figure processing mechanism 22 as mentioned above is efficiently transferred to eight parallel processing lines of the drawing processing mechanism 26 through the parallel data distributing mechanism 24 using the FIFO memories and the high-speed drawing can be realized.

Figure 15:
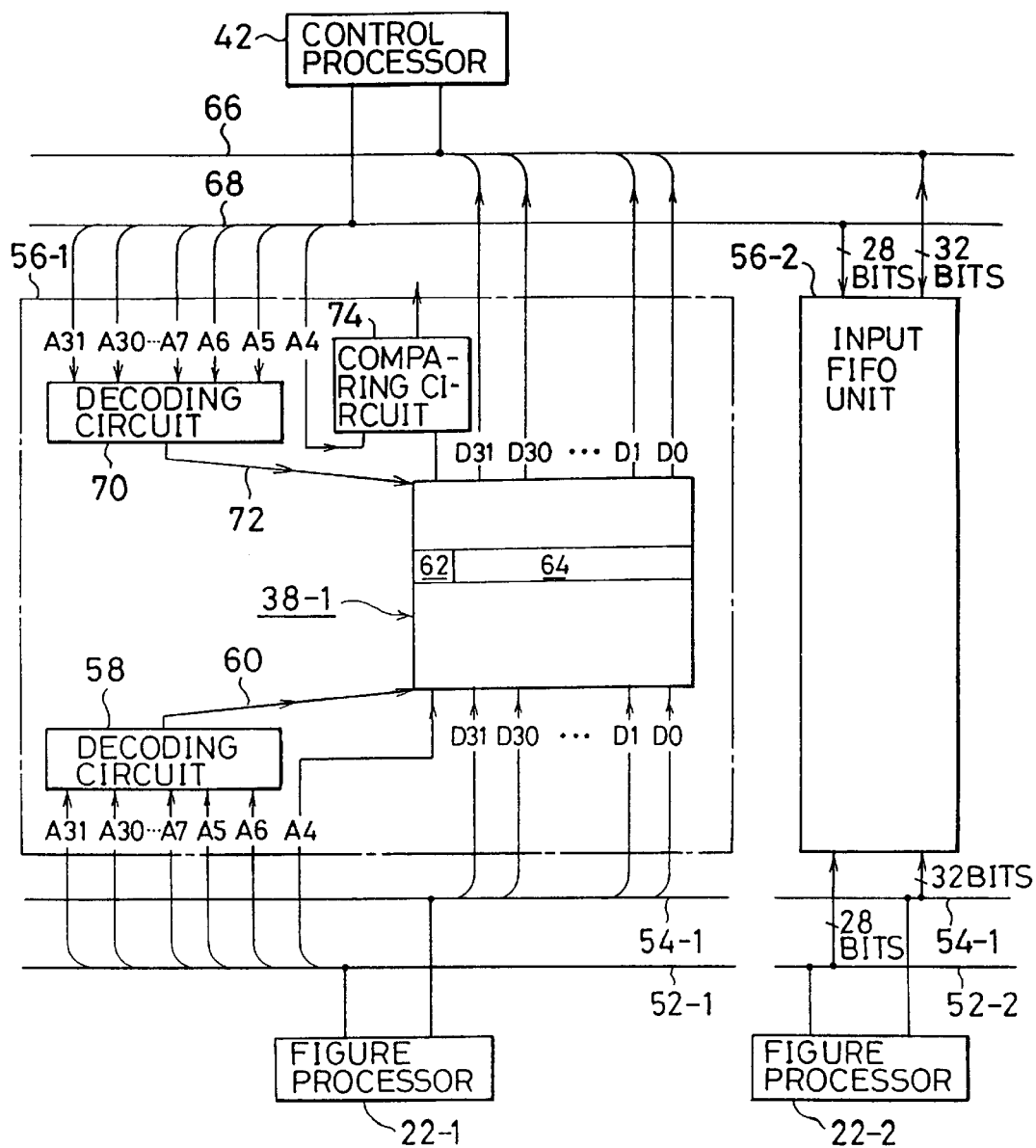
FIG. 15 is a block diagram showing an embodiment of the present invention which is applied to the input FIFO memory side in FIG. 12.
Figure 16:
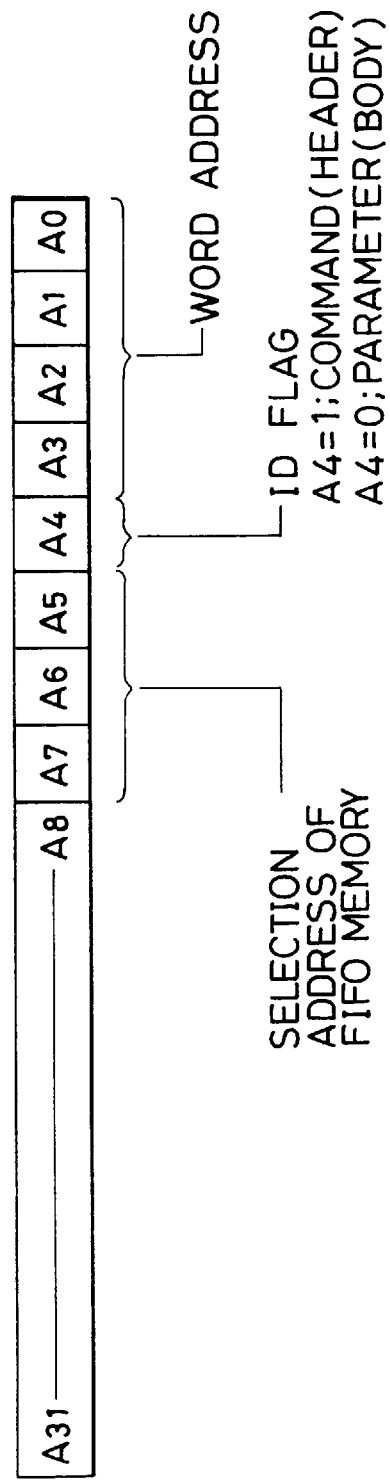
FIG. 16 is an explanatory diagram showing a format of address data in FIG. 15.

FIG. 15 shows the details of the write transfer and read transfer in the parallel data distributing mechanism 24 in FIG. 12 with respect to the input FIFO memory 38-1 as a representative one. The writing operation by the transfer from the figure processor 22-1 is executed to the input FIFO memory 38-1 provided for an input FIFO unit 56-1. The transfer word written in the input FIFO memory 38-1 is read out by the control processor 42 side and is distributed into the output FIFO memories. An address bus 52-1 and a data bus 54-1 are led out from the figure processor 22-1. Address data on the address bus 52-1 is constructed by 32 bits of $A_{31}$ to $A_0$ as shown in FIG. 16. First, lower four bits $A_3$ to $A_0$ indicate a word address of 12 words constructing one span data shown in FIG. 14. An address bit $A_4$ subsequent to the word address is used as an ID flag indicative of the kind of transfer data. For example, when the transfer word indicates a command word having the command ID, namely, the header, $A_4$ is set to 1 ($A_4$=1). When the transfer word indicates each parameter word constructing the body in FIG. 14, $A_4$ is set to 0 ($A_4$=0). Three bits of the next address bits $A_7$ to $A_5$ indicate a selection address to select the input FIFO memories 38-1 to 38-8 provided in FIG. 12. Further, upper address bits $A_{31}$ to $A_8$ indicate an address which is used in an address space of the word data of the figure processor 22-1. Specifically, the address space of the figure processor 22-1 is managed by 31 bits excluding the ID flag $A_4$.

Referring again to FIG. 15, a decoding circuit 58 to select the memory on the basis of the address data by the address bus 52-1 of the figure processor 22-1 is provided for the input FIFO memory 38-1. The decoding circuit 58 interprets the upper bits $A_{31}$ to $A_5$ of the address data shown in FIG. 16. When the 3-bit address allocated to the input FIFO memory 38-1 coincides with the address bits $A_7$ to $A_5$, the decoding circuit 58 generates a selection signal 60 to set the input FIFO memory 38-1 into a writing state. In addition to a word storing area 64 of 32-bit data $D_{31}$ to $D_0$ of one word from the data bus 54-1, a flag storing area 62 of one bit is added to the input FIFO memory 38-1. The address bit $A_4$ in which the ID flag has been set shown in FIG. 16 is stored into the flag storing area 62.

A data bus 66 and an address bus 68 are led out from the control processor 42 on the reading side. A decoding circuit 70 is provided for receiving the address designation by the control processor 42 and for selecting the input FIFO memory 38-1 as a target to be read out. Upper bits $A_{31}$ to $A_5$ of the address bus 68 are supplied to the decoding circuit 70. In a manner similar to the case of the figure processor 22-1 side, in the address selection for the input FIFO memory 38-1 by the control processor 42 as well, when three bits of the address bits $A_7$ to $A_5$ coincide with the values of three bits set in the input FIFO memory 38-1, a selection signal 72 is generated, thereby setting the input FIFO memory 38-1 into a reading operating state. By using the address bit $A_4$, the control processor 42 designates an ID flag indicating whether the command to be read out at present indicates a command word or a parameter word simultaneously with the designation of the input FIFO memory 38-1 by the address. Now, as shown in FIG. 16, now assuming that $A_4$=1, the reading of the command (header) is designated. On the other hand, when it is assumed that $A_4$=0, the reading of the parameters (body) is designated. Since the input FIFO memory 38-1 has a first-in first-out reading/writing function, when the memory 38-1 is set into the reading mode by the selection signal 72, the data bits $D_{31}$ to $D_0$ of the oldest transfer word are read out to the data bus 66. Simultaneously, an ID flag of the flag area 62 is re ad out and supplied to a comparing circuit 74. The comparing circuit 74 is constructed by an exclusive OR circuit. In the reading mode of the input FIFO memory 38-1, when the address bit $A_4$ coincides with the flag bit of the flag area 62, an output of the comparing circuit 74 is set into a logic level 0. The control processor 42 can recognize that the command to designate the reading operation or parameter have normally been read out. On the contrary, when the address bit $A_4$ doesn't coincide with the flag bit of the flag storing area 62, the output of the comparing circuit 74 is set to the logic level 1 and is used as an interruption signal of an error notification to the control processor 42. The control processor 42 can recognize that there is an abnormality in the transfer word which was read out from the input FIFO memory 38-1. The control processor 42 which determined the abnormality of the transfer word stops the processes of 12 words constructing one span data and is shifted to the mode to read out from the command word in which the next correct ID flag is obtained. In this case, the drawing of the span data in which the process was stopped or the one-preceding span data is abnormal. The processes of the subsequent span data, however, can be normally continued. On the other hand, so long as the control processor 42 recognizes the occurrence of the error and notifies the error to the figure processor 22-1 by interruption, an error recovering process by the transfer of the correct span data to the input FIFO memory 38-1 can be again executed. Since the abnormality of the transfer word mainly occurs by the software process on the figure processor 22-1 side, such a process is an effective error recovering process. Such write transfer and read transfer for the input FIFO memory 38-1 shown in FIG. 15 are also similarly executed with respect to input FIFO units 56-2 to 56-8 having the remaining input FIFO memories 38-1.

Figure 17:
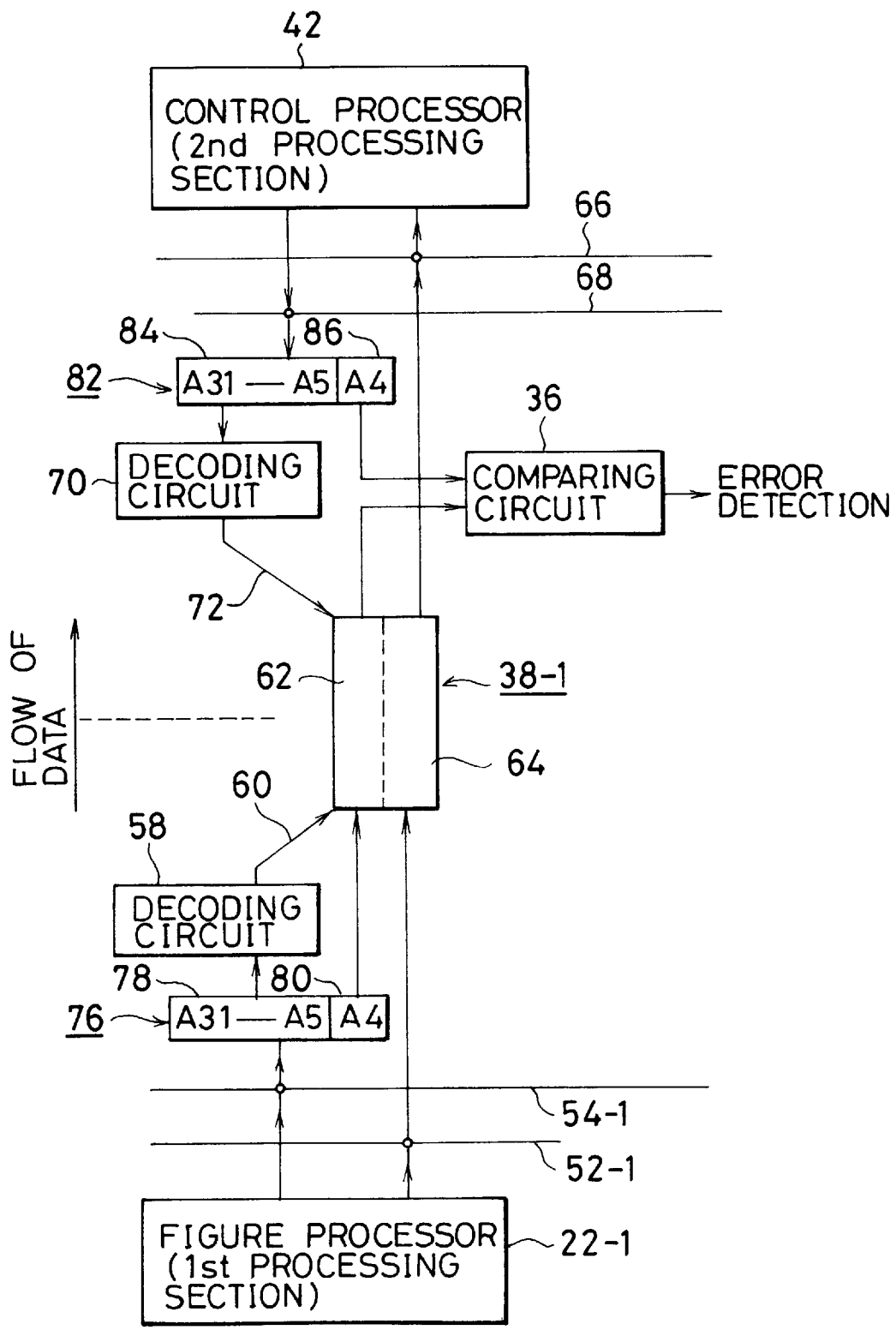
FIG. 17 is an explanatory diagram showing a transfer function by data writing and reading operations in FIG. 15.

FIG. 17 shows writing and reading functions for the input FIFO memory 38-1 in FIG. 15. In this case, the figure processor 22-1 functions as a first processing section and designates the input FIFO memory 38-1 by an upper bit portion of an address 76, namely, address bits $A_{31}$ to $A_5$ and generates the selection signal 60 from the decoding circuit 58, thereby writing the inherent word data into the word storing area 64 of the input FIFO memory 38-1. At the same time, since a lower bit portion 80 of the address 76, namely, the address bit $A_4$ has been inputted as an ID flag indicative of the command word or parameter word, the lower bit portion 80 is written into the flag area 62 of the input FIFO memory 38-1.

On the other hand, the control processor 42 side serving as a second processing section generates an address 82 in which in addition to an upper address portion 84 to designate the input FIFO memory 38-1, a lower bit portion 86 showing whether the word to be read out indicates a command word or a parameter word have been added. The upper bit portion 84 of the address 82 is decoded by the decoding circuit 70. When it coincides with the designated address of the input FIFO memory, the selection signal 72 is generated, thereby setting the apparatus into a reading operating mode. Due to this, the inherent transfer data, namely, the command word or parameter word is read out from the word storing area 64. At the same time, a flag bit is read out from the flag area 62 and compared with the lower bit portion 86, namely, address bit $A_4$ by the comparing circuit 74. In this instance, in case of reading out the command word, since the address bit $A_4$ serving as a lower bit portion 86 is equal to 1 ($A_4$=1), the read bit from the flag area 62 is likewise equal to 1 so long as the transfer data is correct. The output of the comparing circuit 74 is set to the logic level 0 and indicates the normal transfer. On the other hand, when the read bit from the flag area 62 is equal to 0 because of the occurrence of abnormality such as a loss of command word or the like, the output of the comparing circuit 74 is set to 0 and an error detection signal is generated. The occurrence of the error is notified to the control processor 42 by an interruption. The processes of one span data of 12 words in which an abnormality occurred are stopped or an error recovering process due to a request of the recalculation to the figure processor 22-1 is executed.

Figure 18:
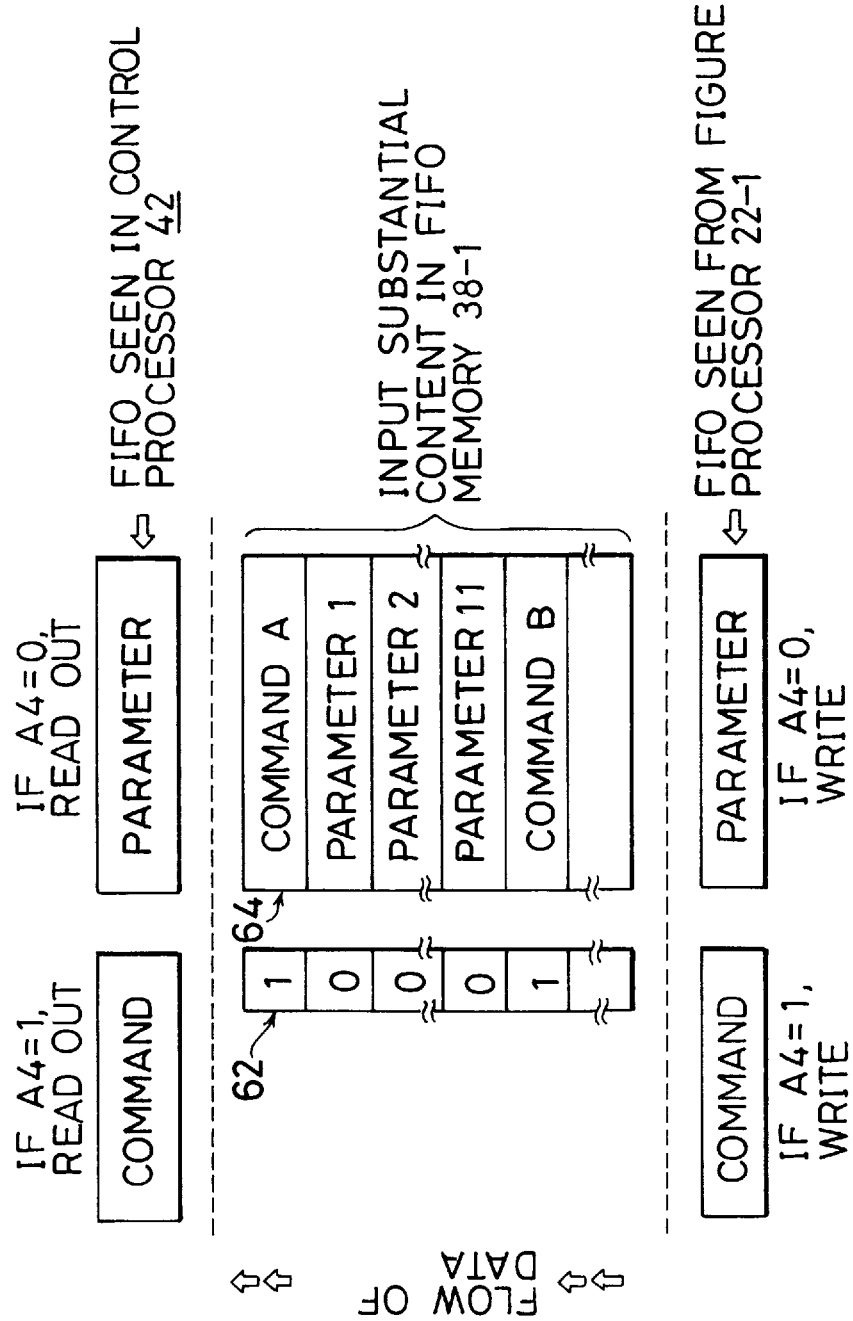
FIG. 18 is an explanatory diagram showing a state of data transfer according to the embodiment of FIG. 15.

FIG. 18 shows the setting of a write flag in the writing mode and the setting of a read flag in the reading mode for the input FIFO memory 38-1 in FIG. 15. That is, when the command word is written, the figure processor 22-1 sets the address bit $A_4$ into 1 and writes it. When the parameter word is written, the figure processor 22-1 sets the address bit $A_4$ into 0 and writes it. Therefore, the value of the ID flag corresponding to the command parameter of the word storing area 64 in the input FIFO memory 38-1 is stored into the flag storing area 62. In the reading mode by the control processor 42, when the command word is read out, the address bit $A_4$ is set to 1 and the command word is read out. On the other hand, when the parameter word is read out, the address bit $A_4$ is set to 0 and the parameter word is read out. By comparing the read bit of the flag area 62 at the reading position and the address bit $A_4$, an abnormality of the transfer data can be recognized.

Figure 19:
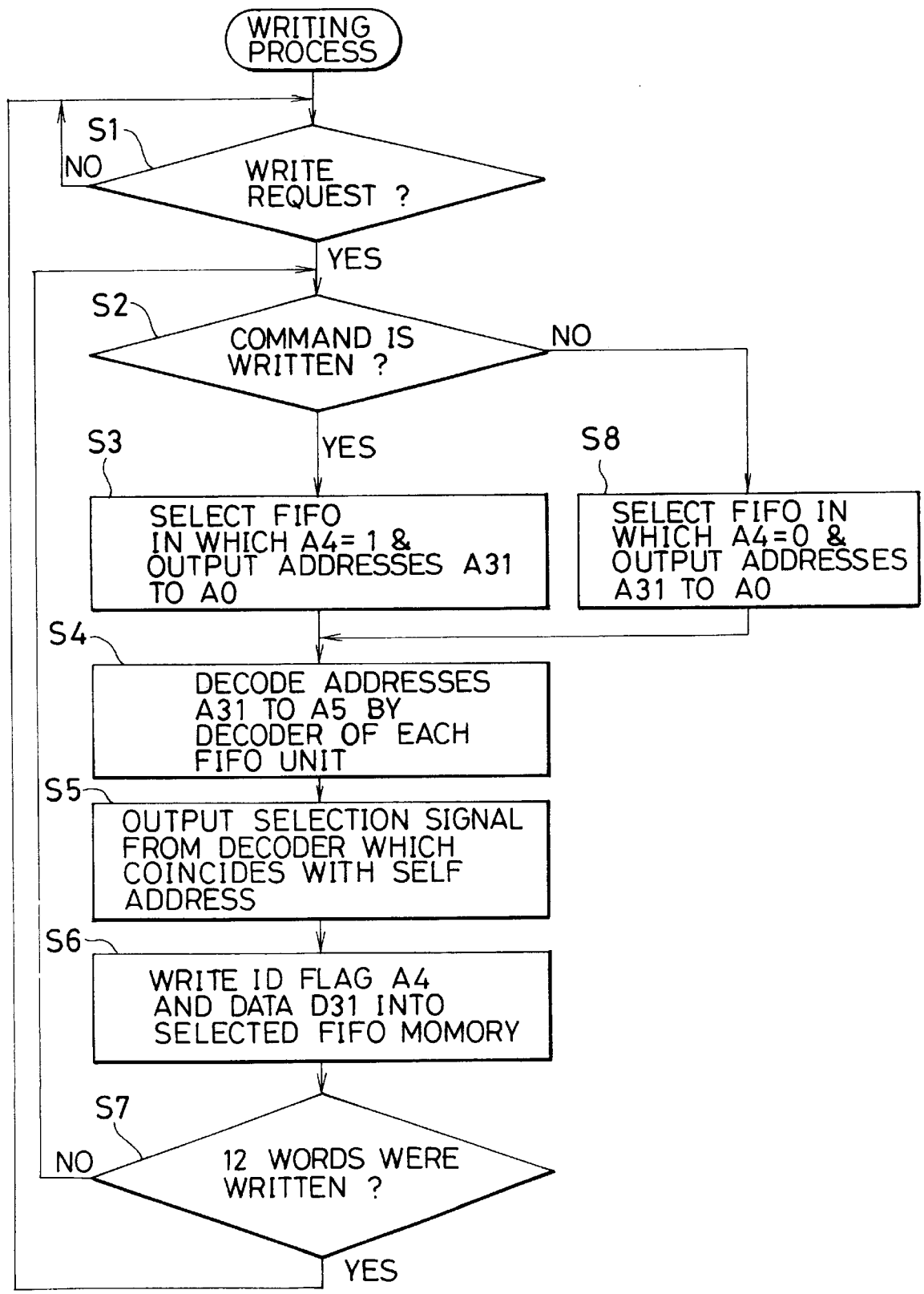
FIG. 19 is a flowchart showing write transferring processes according to the embodiment of FIG. 15.

FIG. 19 is a flowchart showing writing processes for the input FIFO memory 38-1 in FIG. 15. First, in step S1, when a write request is generated from the figure processor 22-1, step S2 follows and a check is made to see if the command word is written or not. If YES, step S3 follows and the selection addresses $A_{31}$ to $A_0$ in the FIFO memory in which the address bit $A_4$=1 are supplied to the address bus 52-1. Subsequently, the addresses $A_{31}$ to $A_5$ are decoded by the decoding circuit 58 of the corresponding FIFO unit. In step S5, a selection signal is generated from the decoding circuit 58 in which the address coincides with the self address and either one of the eight input FIFO memories 38-1 -to 38-8 is set into the writing operating mode. In step S6, the ID flag $A_4$ and the inherent word data $D_{31}$ to $D_0$ are written into the selected input FIFO memory. In step S7, a check is made to see if the writing operation of 12 words constructing one pixel has been finished or not. If NO, the processing routine is returned to step S2. After the command word, the parameter word is written. Therefore, the processing routine advances to step S8 and the FIFO selection addresses $A_{31}$ to $A_0$ in which the address bit $A_4$ is set to 0 are outputted. In a manner similar to the case of the command word, the ID flag and parameter word are written into the input FIFO memories in steps S4 to S6. When completion of the writing operation of 12 words constructing one pixel is decided in step S7, the processing routine is returned to step S1 and the apparatus waits for the generation of a write request of the next pixel data.

Figure 20:
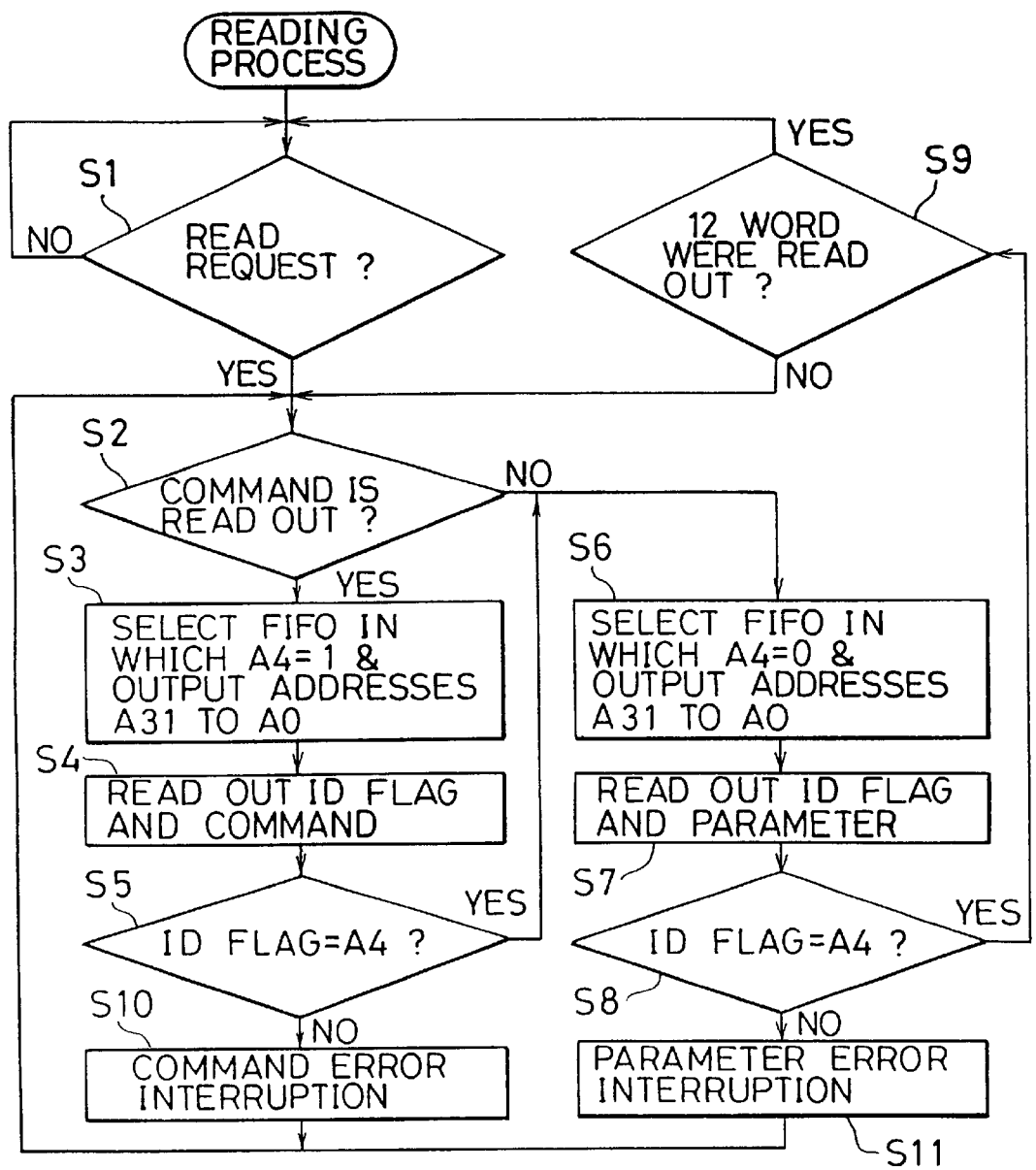
FIG. 20 is a flowchart showing read transferring processes according to the embodiment of FIG. 15.

FIG. 20 is a flowchart showing reading processes from the input FIFO memories by the control processor 42 in the embodiment of FIG. 15. First, in step S1, a check is made to see if a read request has been generated from the control processor 42 or not. If YES, step S2 follows and a check is made to see if the command word is read out or not. Since the command word is read out at first, step S3 follows and the FIFO selection addresses $A_{31}$ to $A_0$ in which the address bit A4=1 are outputted. In response to the address output, a selection signal 72 of either one of the eight input FIFO memories 38-1 to 38-8 is made effective and the oldest data stored in this instance is read out from the word storing area 64 and flag storing area 62. Subsequently, a check is made to see if the read-out ID flag coincides with the address bit $A_4$ or not in step S5. In case of the transfer of the correct command word, since they coincide, the processing routine advances to the step of reading out the parameter word in step S6 and subsequent steps. In step S6, since the parameter word is designated, the FIFO selection addresses $A_{31}$ to $A_0$ in which the address bit $A_4$=0 are outputted. Due to this, the ID flag and parameter word of the next area in the same input FIFO memory as that from which the command word was read out are read out in step S7. In step S8, a check is made to see if the address bit $A_4$ coincides with the ID flag or not. When they coincide, the processing routine is returned to step S9 and a check is made to see if the reading operation of 12 words constructing one span data has been finished or not. If YES, the processing routine is again returned to step S1 and the apparatus waits for the reading of the data of the next pixel.

On the other hand, in step S5, when there is an abnormality in the command word and the ID flag doesn't coincide with the address bit $A_4$, step S10 follows. A command error interruption signal is generated and the drawing processes of the span data by the command is stopped or the recalculation is requested by the error notification to the figure processor 22-1. In step S8, in case of an abnormality such that the ID flag indicative of the parameter word doesn't coincide with the address bit $A_4$, namely, when the transfer word which should inherently be a parameter indicates a command word, the control processor 42 recognizes the occurrence of the parameter error interruption in step S11 and the processes of the span data including the parameter are interrupted or the recalculation is requested to the figure processor 22-1.

Figure 21:
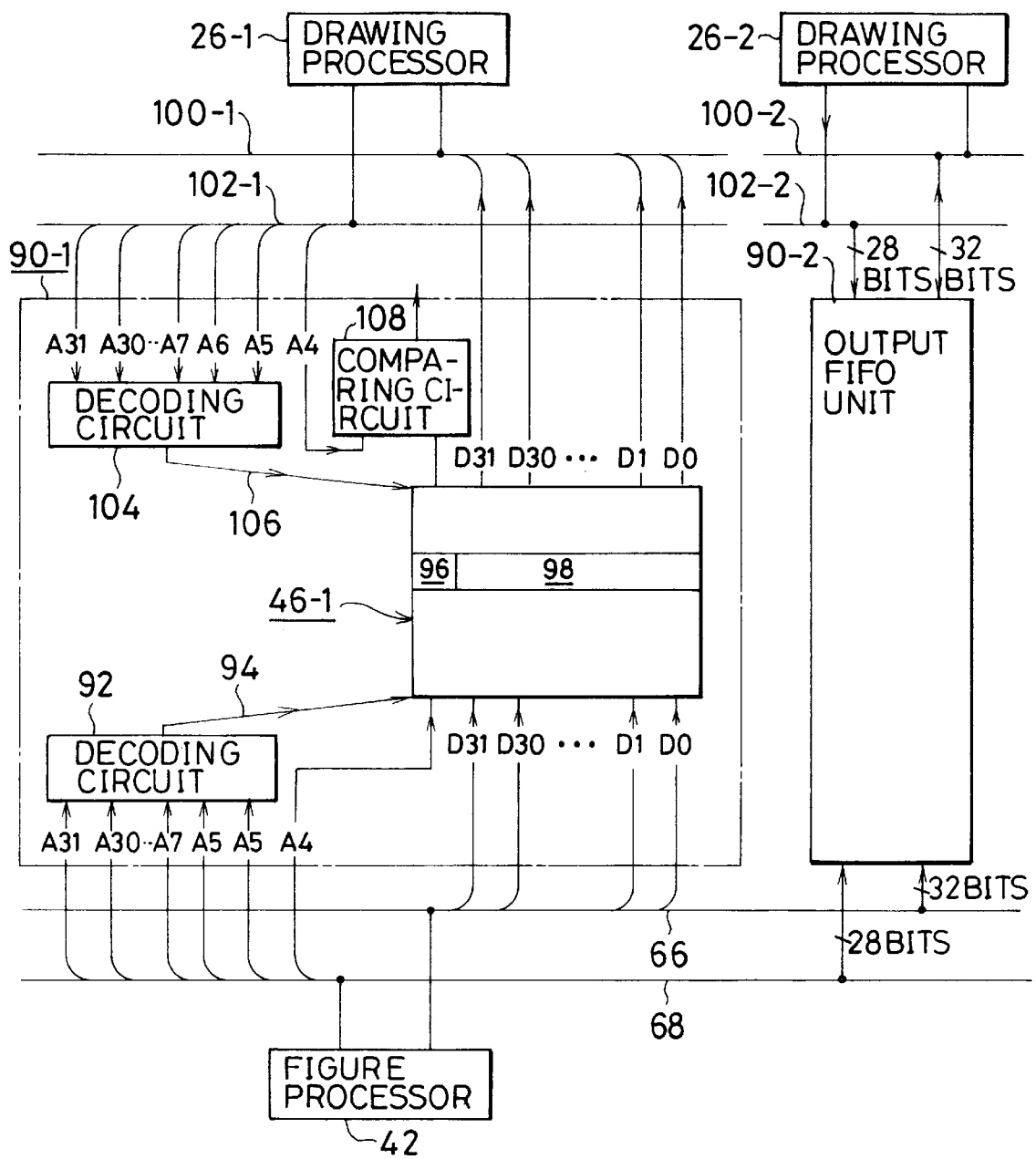
FIG. 21 is a block diagram showing an embodiment of the present invention which is applied to the output FIFO memory side in FIG. 12.

FIG. 21 shows the details of the data transfer apparatus of the invention to the output FIFO memory side in FIG. 12 and is fundamentally similar to that on the input FIFO memory side in FIG. 15. That is, FIG. 21 shows an output FIFO unit 90-1 having the output FIFO memory 46-1 as a representative. The first processing section corresponds to the control processor 42 to execute a data distribution. The second processing section corresponds to the drawing processor 26-1. The output FIFO memory 46-1 is constructed by a word storing area 98 and a flag storing area 96. A decoding circuit 92 is provided on the writing side and decodes the upper address bits $A_{31}$ to $A_5$ from the address bus 68 by the control processor 42. When they are effective, the decoding circuit 92 generates a selection signal 94, thereby setting the output FIFO memory 46-1 into a writing mode. The address bit $A_4$ indicates an ID flag which is set to 1 in case of the command word and to 0 in case of the parameter word and is written into a flag area 96 in the output FIFO memory 46-1. A decoding circuit 104 and a comparing circuit 108 are provided on the reading side. The decoding circuit 104 receives the upper bits $A_{31}$ to $A_5$ of the read address by the drawing processor 26-1. When the read address coincides with the allocated address, the decoding circuit 104 generates a selection signal 106, thereby setting the output FIFO memory 46-1 into a reading operating mode. The comparing circuit 108 is constructed by an exclusive OR circuit and compares the address bit $A_4$ and the flag bit read out from the flag storing area 96 in the output FIFO memory 46-1. When they coincide, the transfer word is decided to be correct. When they don't coincide, it is decided that there is an abnormality such as a loss or the like in the transfer word, so that an interruption signal is supplied to the drawing processor 26-1. Each of the remaining seven output FIFO units 90-2 to 90-8 also has a construction similar to that mentioned above. The writing and reading operations are also similar to those in the embodiment of FIG. 15 except that the writing side is set to the control processor 42 and the reading side is set to the drawing processor 26-1.

Figure 22:
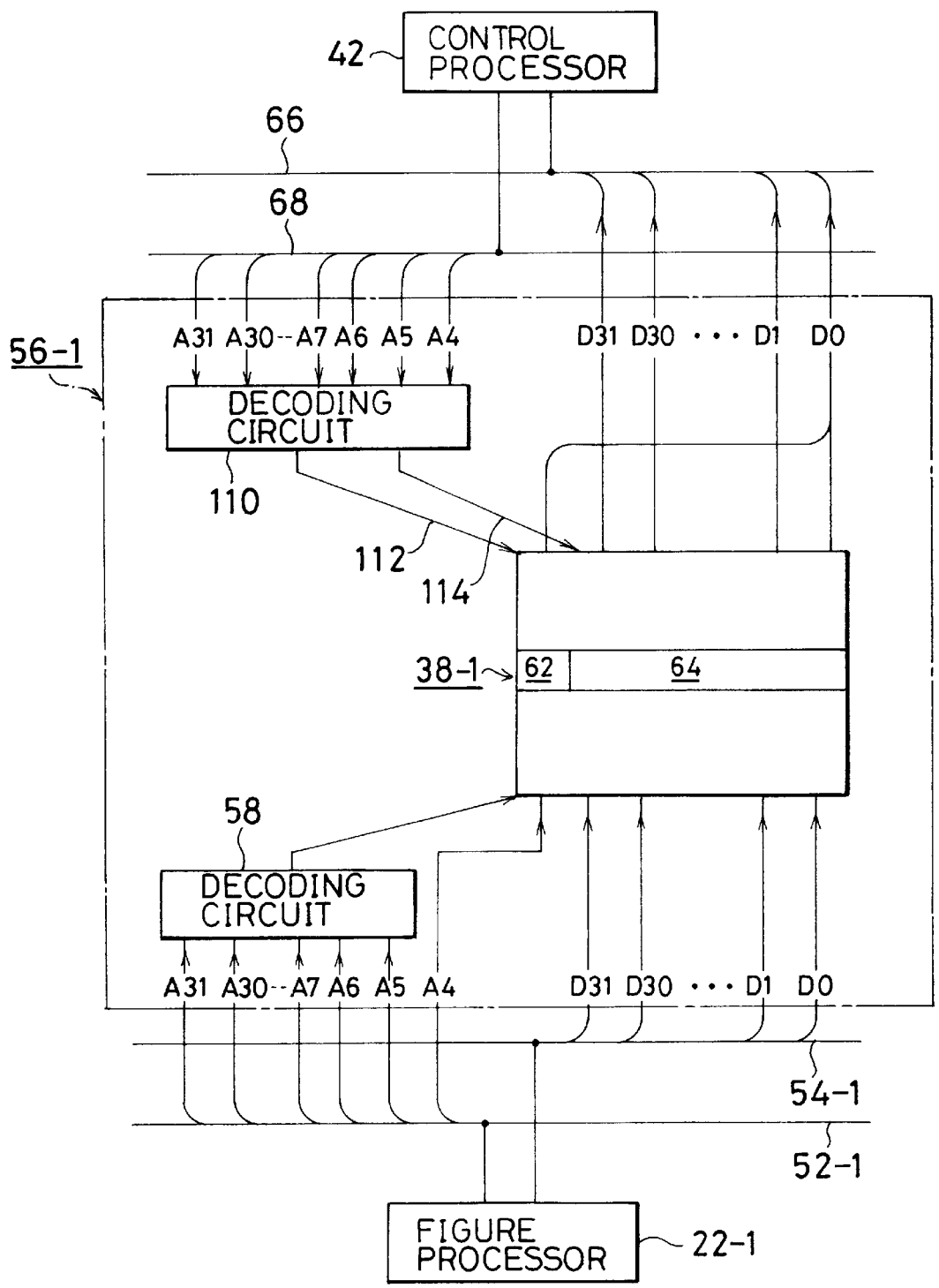
FIG. 22 is a block diagram showing a modification of FIG. 15.

FIG. 22 shows a modification of FIG. 15. The modification is characterized in that in the reading control of the FIFO memory, the flag storing area 62 and word storing area 64 are selectively enabled to be read out. For this purpose, a decoding circuit 110 on the reading side generates a selection signal 112 of the flag storing area 62 when the address bit $A_4$=1. When the address bit $A_4$=0, the decoding circuit 110 generates a selection signal 114 of the word storing area 64. The flag bit read out from the flag storing area 62 by the selection signal 112 is supplied as a data bit $D_0$ to the control processor 42. Whether the transfer word is a command word or a parameter word is discriminated by a software. The other constructions are substantially similar to those in the embodiment of FIG. 15.

Figure 23:
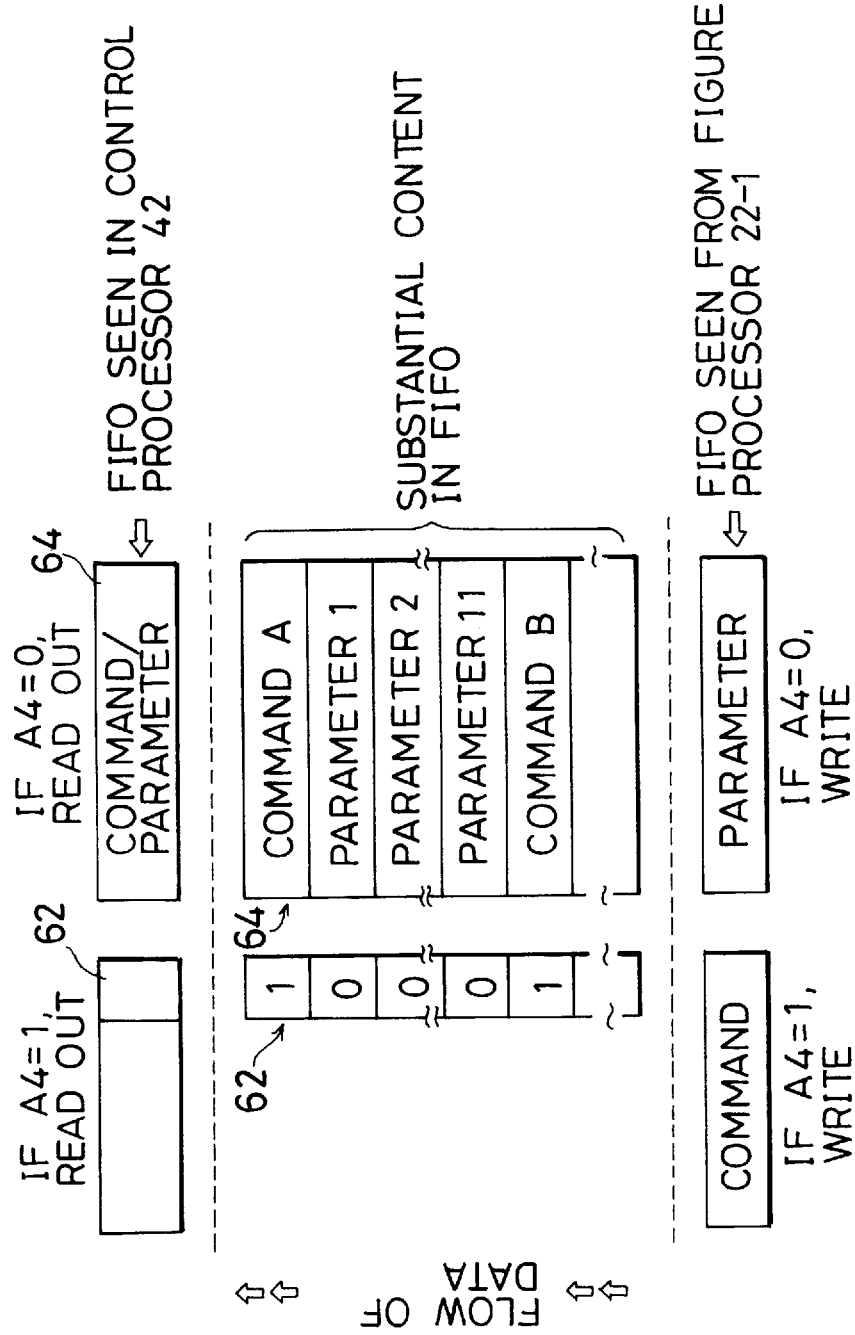
FIG. 23 is an explanatory diagram showing a state of data transfer according to the modification in FIG. 22.

FIG. 23 shows the writing and reading operations in the modification of FIG. 22. In the writing mode, in a manner similar to the case of FIG. 15, when the command word is written, the address bit $A_4$ is set to 1 and the command word is written. When the parameter word is written, the address bit $A_4$ is set to 0 and the parameter word is written. On the contrary, in the reading mode, when the address bit $A_4$ is equal to 1, only the value of the flag storing area 62 in the input FIFO memory 38-1 can be read out. By setting the address bit $A_4$ to 0, only the command word or parameter word can be read out from the word storing area 64 in the input FIFO memory 38-1. Therefore, when the command word is read out, the address bit $A_4$ is first set to 1 and the ID flag is read out. If the read-out ID flag is equal to 0 and the transfer word is not a command word, an error in the transfer word is judged. In this case, until the ID flag 1 indicative of the command word is read out, the reading operation of the input FIFO memory 38-1 is skipped. At a time point when the ID flag is set to 1, the address bit $A_4$ is set to 0 and it is sufficient to read out the command word.

Figure 24:
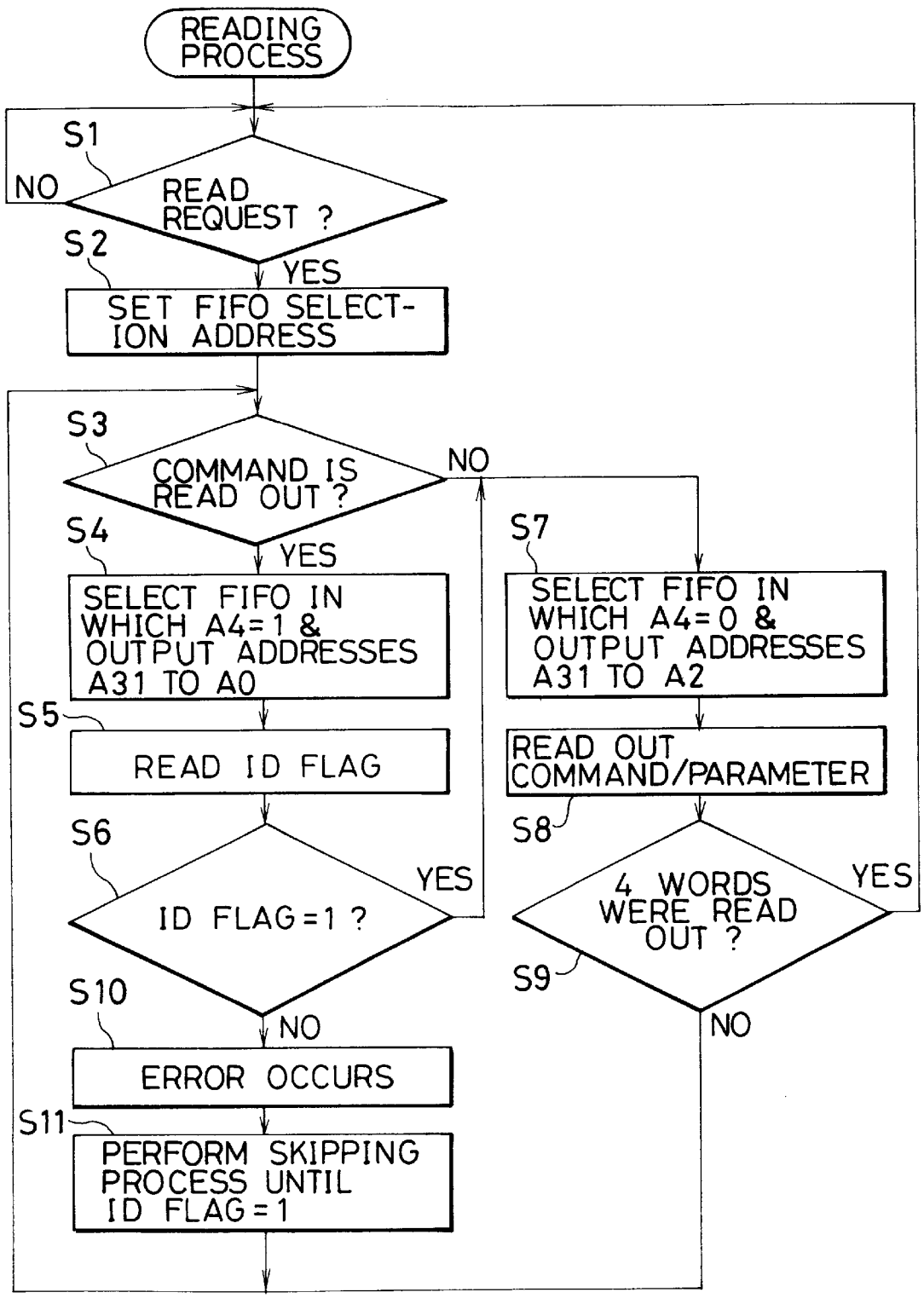
FIG. 24 is a flowchart showing read transferring processes in FIG. 22.

FIG. 24 is a flowchart showing reading processes in the embodiment of FIG. 22. First, in step S1, when a read request of the data of one pixel is generated, an FIFO selection address is set in step S2. A check is made in step S3 to see if the command word is read out or not. If YES, step S4 follows and the FIFO selection addresses $A_{31}$ to $A_0$ in which the address bit $A_4$=1 are supplied to the address bus 68. Due to this, the selection signal 112 from the decoding circuit 110 is made effective and the flag is read out from the flag storing area 62 in the input FIFO memory 38-1. In step S5, the ID flag which is read out as a data bit $D_0$ to the data bus 66 is supplied to the control processor 42. In step S6, a check is made to see if the read ID flag is equal to 1 indicative of the command word or not. If YES, the transfer word is decided to be correct and step S7 follows. The FIFO selection addresses $A_{31}$ to $A_0$ in which the address bit $A_4$=0 are supplied to the address bus 68. The selection signal 114 from the decoding circuit 110 is made effective and the command word is read out from the word storing area 64 in the input FIFO memory 38-1 in step S8. Subsequently, in step S9, a check is made to see if 12 words constructing one span data have completely been read out or not. The processes in steps S3 to S9 are repeated until 12 words are read out. After 12 words were read out, the processing routine is returned to step S1 and the apparatus waits for the generation of the read request of the data of the next pixel.

In step S6, when the ID flag doesn't coincide with $A_4$=1 indicative of the command word, step S10 follows and the occurrence of error in the transfer word is recognized. In this case, until the ID flag is set to 1 indicative of the command word in step S1, the reading operation of the input FIFO memory is skipped. The process advances to the reading operation of the correct span data. It is also obviously performed to execute the error recovery by requesting a recalculation to the figure processor 22-1. The construction of the modification shown in FIG. 22 can be also substantially similarly applied to the output FIFO memory side shown in FIG. 21.

In the data transfer apparatus of the invention as mentioned above, by recognizing the kind of data on the transfer destination side without operating the transfer word itself, an abnormality such as a loss of transfer data or the like can be known. The processes of the abnormal data can be interrupted or the correct data can be also again transferred as necessary. It is, consequently, possible to certainly prevent a breakage of the drawing data due to a bug of the software or the like or a situation such that the command word becomes abnormal due to the transmission of the abnormal data and the drawing process causes a runaway. Particularly, since the breakage of the transfer data and the transmission of abnormal data occur in the figure processing section which operates by a software, by using the data transfer apparatus of the invention at the stage of development of the program which is used in the figure processing section, there is a large advantage such that the error in the transfer data to the drawing processing section is known and it is possible to cope with a bug of the software in the figure processing section.

Figure 25:
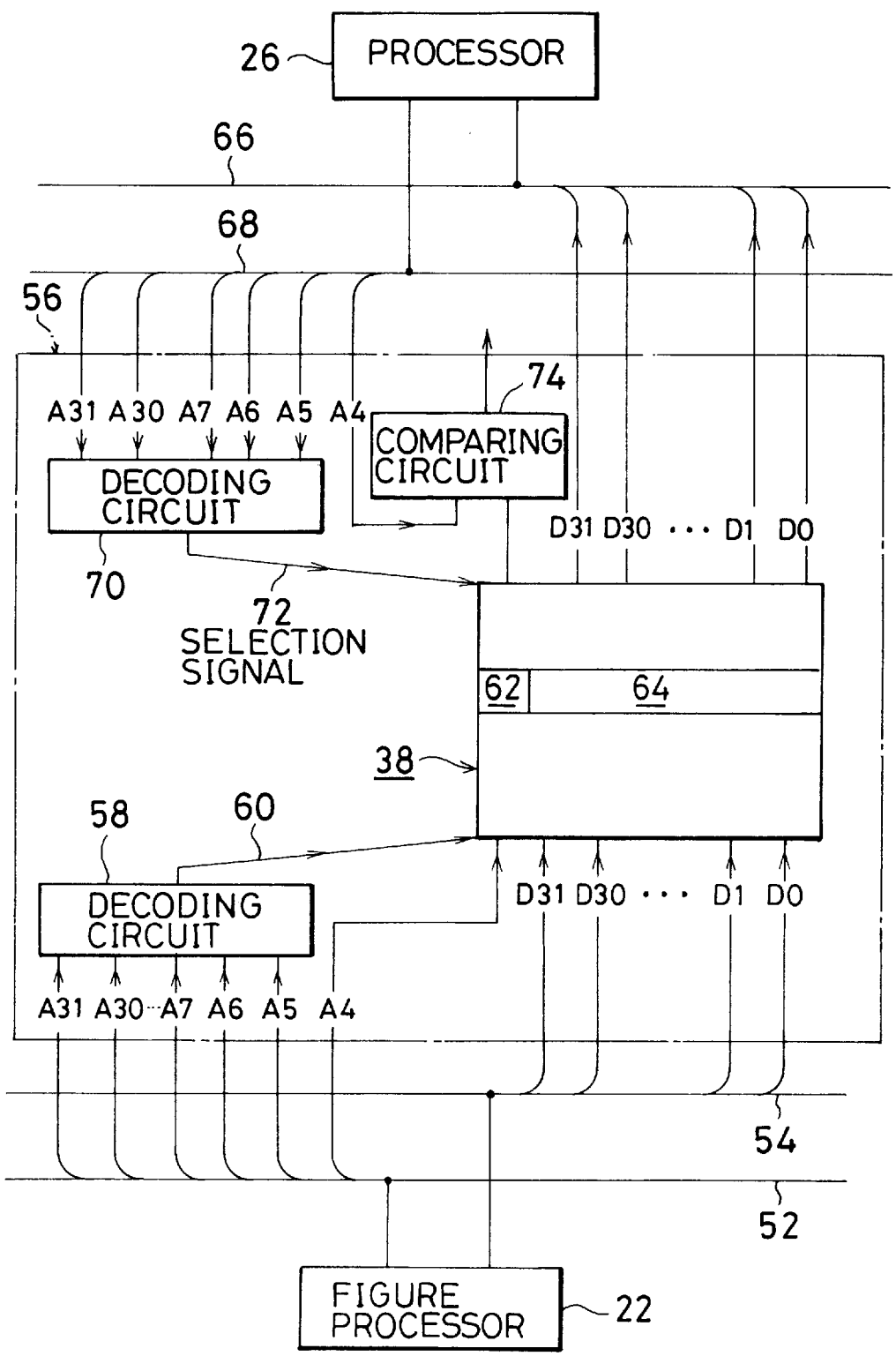
FIG. 25 is a block diagram showing an embodiment of a data transfer apparatus of the invention which is used in a program development for figure processes.

FIG. 25 shows an embodiment of a data transfer apparatus of the invention using an FIFO memory which is used in the development of a program that is used in the figure processing mechanism 22 in FIG. 11. The embodiment is fundamentally similar to the input FIFO unit in FIG. 15 and the function of the parallel data distributing mechanism 24 shown in FIG. 12 is replaced to a simple data transfer mechanism using one FIFO memory 38. By using a simulating apparatus as shown in FIG. 25, the developed program is executed by the figure processor 22 and the results of the processes are transferred to the drawing processor 26 via an FIFO unit 56. The bug of the program which is being executed by the figure processor 22 can be recognized in a real-time manner on the basis of whether an interruption signal at the logic level 1 indicative of the error of the transfer word is derived from the comparing circuit 74 in the reading transferring mode or not. The embodiment can be efficiently made useful to the development of the figure calculating program of the figure processor 22.

Although the embodiment has been described with respect to an example of the case where the ID flag indicates two discrimination results of the command word (header) and parameter word (body), in case of increasing the number of kinds to be discriminated, it is sufficient to increase the number of bits of the ID flag as necessary.

Figure 26:
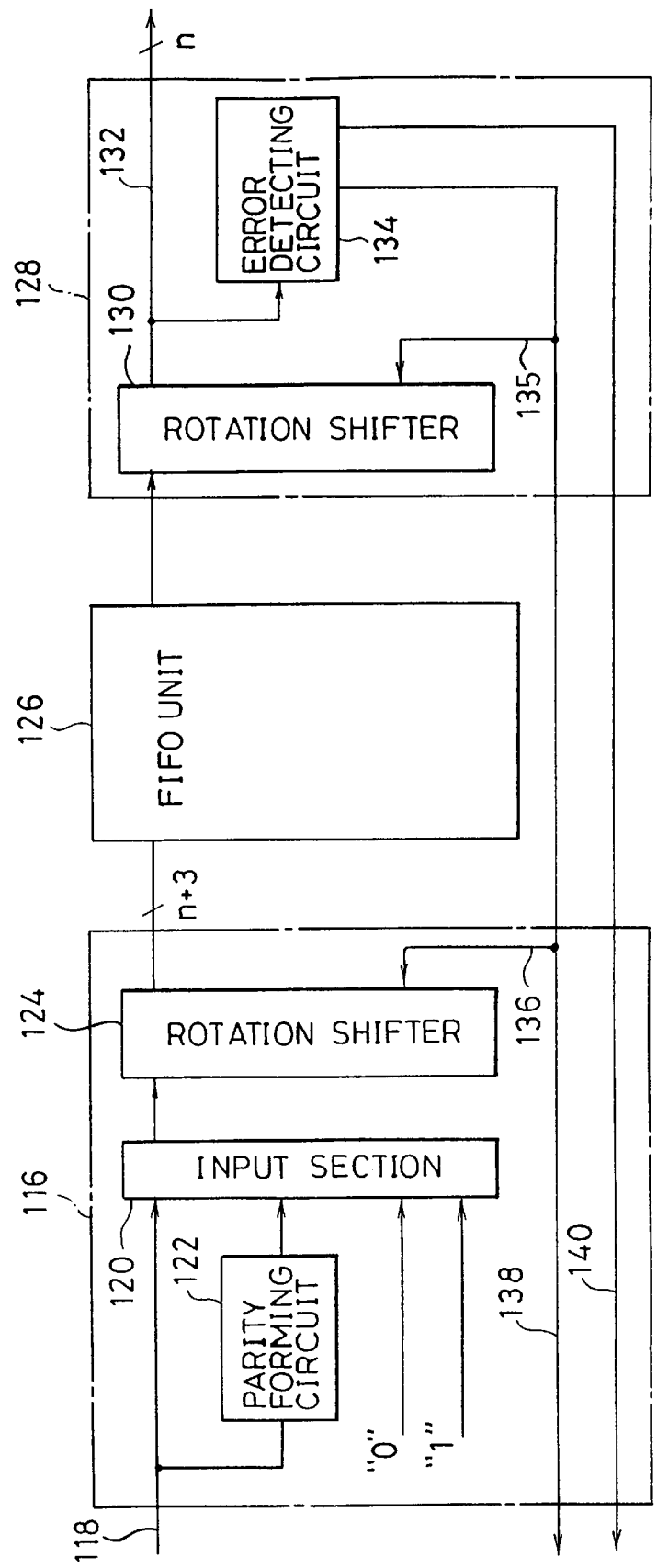
FIG. 26 is a block diagram showing a fundamental embodiment of a data transfer apparatus of the invention in which redundant bits are added.

FIG. 26 shows a fundamental embodiment of a data transfer apparatus of the invention to detect a loss of word by adding redundant bits. The data transfer apparatus comprises a transmitting section 116, an FIFO unit 126, and a receiving section 128. The transmitting section 116 has a data input 118, an input section 120, a parity forming circuit 122, and a rotation shifter 124. The data input 118 sequentially receives n-bit word data from a data source and supplies to the input section 120 and parity forming circuit 122. For example, in case of applying to the parallel data distributing mechanism 24 in FIG. 11, the data input 118 sequentially inputs 12 words (one word consists of 32 bits) constructing one span data as one group. The parity forming input section 120 forms parity bits from the bits of one word from the data input 118 and supplies to the input section 120. The input section 120 adds transmission side judgment bits of two bits having a fixedly predetermined bit arrangement 01 to the word data from the data input 118 and, further, forms a transfer word in which the parity bit of one bit from the parity forming circuit 122 has been added. The transfer word is supplied to the rotation shifter 124. The transfer word is constructed by 35 bits since three bits are added in the case where one word consists of 32 bits. The rotation shifter 124 sequentially shifts the transfer word supplied from the input section 120 one bit by one each time one word is inputted and writes and transfers the shifted word into the FIFO unit 126.

A rotation shifter 130 and an error detecting circuit 134 are provided in the receiving section 128. The rotation shifter 130 executes a bit shifting process in the direction opposite to that in case of the bit shifting process which has been executed by the rotation shifter 124 of the transmitting section 116, thereby returning the arrangement of the bit train to the original order. After that, the rearranged data is sent to the data output 132. The error detecting circuit 134 receives lower three bits including the transmission side judgment bits of two bits in the transfer word which was returned by the rotation shifter 128 and discriminates whether the word has correctly been transferred or an error has occurred or not. When the bit arrangement of lower two bits of the reception side judgment bits of three bits corresponding to the two transmission side judgment bits doesn't coincide with the fixedly predetermined bit arrangement 01 of the transmission side judgment bits, the error detecting circuit 134 decides the occurrence of an error and generates reset signals 135 and 136 to reset the shift amounts to zero to the rotation shifters 130 and 124. At the same time, a retransmission request 138 is supplied to a CPU as a data source. When an error again exists in the transfer word which was retransmitted in response to the retransmission request 138, a signal 140 indicating that the data cannot be recovered is supplied to the CPU as a data source. In this instance, the error detecting circuit 134 notifies the kind of transfer error such as loss of one word, loss of two or more words, hardware failure in which all of the bits are fixed to 0, or a hardware failure in which all of the bits are fixed to 1. When the power supply is turned on, since the shift amounts of the rotation shifters 124 and 130 are reset to 0 in response to the reset signals 135 and 136 from the error detecting circuit 134, both of the rotation shifters are always synchronized so long as t here is no loss of word.

Figure 27:
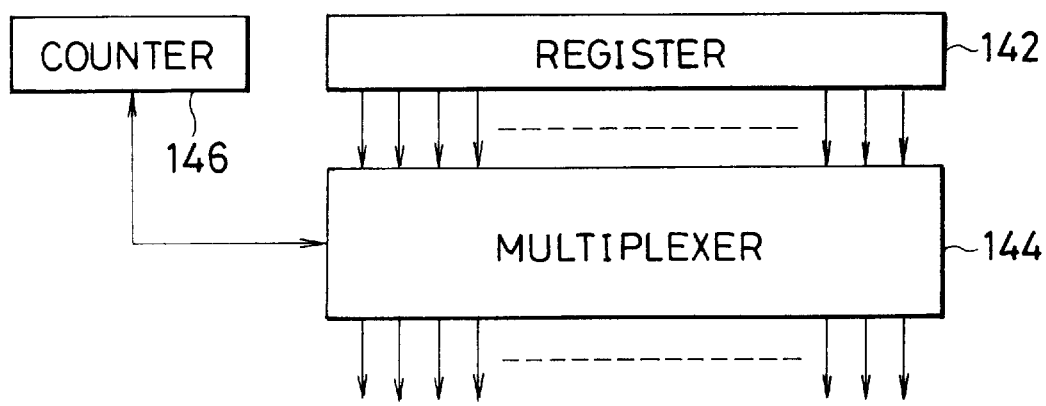
FIG. 27 is a block diagram showing an embodiment of a rotation shifter in FIG. 26.

FIG. 27 shows an embodiment of the rotation shifters 124 and 130 which are used in the transmitting section 116 and receiving section 128 in FIG. 26. Each of the rotation shifters 124 and 130 is constructed by: a register 142 comprising (n+3) bits; a multiplexer 144 for selecting and outputting a loaded word so as to shift the bits; and a counter 146 for counting the number of words and sequentially switching a selecting condition of the multiplexer 144. As for the word data of (n+3) bits which was loaded in the register 142, the bit selection switching position of the multiplexer 144 is shifted one bit by one bit in accordance with the value indicative of the word number counted by the counter 146. Thus, the mth word is shifted by (m−1) bits and is outputted from the multiplexer 144.

Figure 28:
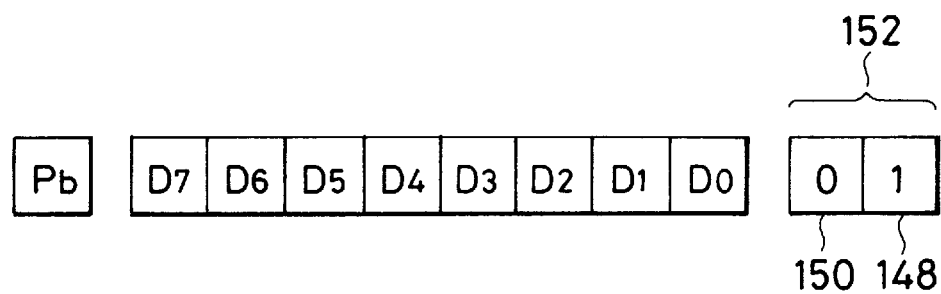
FIG. 28 is an explanatory diagram showing a construction of a transfer word.

The details of the data transfer in the embodiment of FIG. 26 will now be described with reference to FIGS. 28 to 32. FIG. 28 shows a transfer word which is formed in the input section 120. The case where one word is constructed by (n−8) bits is shown as an example. The input section 120 adds a parity bit $P_b$ to the most significant position of one-word data $D_7$ to $D_0$ and, further, adds transmission side judgment bits 152. The transmission side judgment bits 152 are constructed by a 1 fixed bit 148 of the first bit and a 0 fixed bit 150 of the second bit. Therefore, the transfer word comprises eleven bits in which three bits were added to the 8-bit word data $D_7$ to $D_0$.

Figure 29:
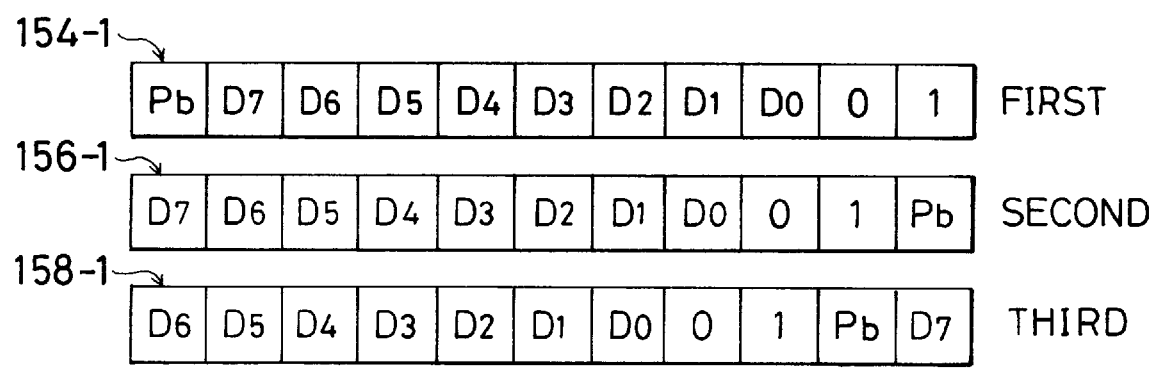
FIG. 29 is an explanatory diagram showing a rotation shift on the transmission side.

The transfer word of 11 bits formed in the input section 120 as shown in FIG. 28 is given to the rotation shifter 124 and is subjected to a bit shifting process shown in FIG. 29. FIG. 29 shows the bit shift of three words. In case of the first transfer word 154-1, since m=1, its bit shift amount is m−1=0 and the first transfer word is outputted as it is without shifting the bits. In case of the second transfer word 156-1, since m=2, its bit shift amount is equal to m−1=1 and the second transfer word is shifted to the left by one bit (toward the upper side) and is outputted. Further, in case of the third transfer word 158-1, since m=3, its bit shift amount is equal to m−1=2 and the third transfer word is shifted to the left side by two bits (toward the upper side) and is outputted.

Figure 30:
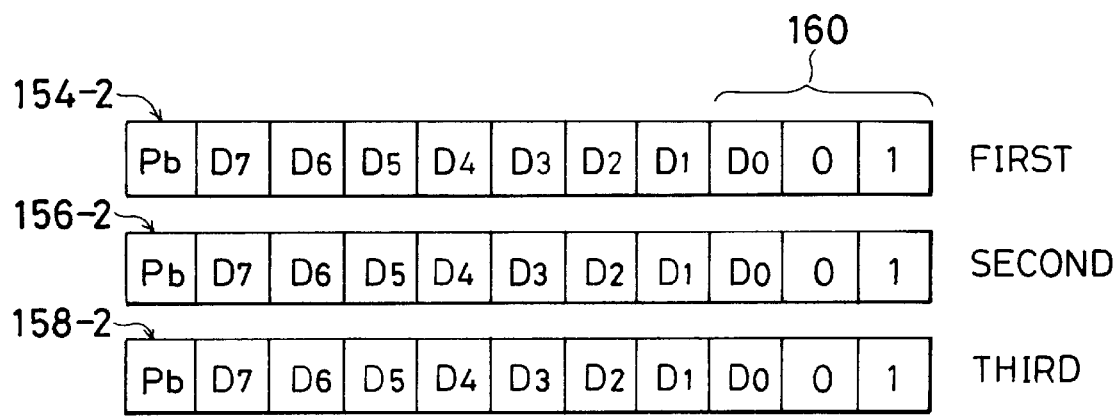
FIG. 30 is an explanatory diagram of transfer words after completion of the reverse shift at the time of normal reception.

FIG. 30 shows a shifting state by the rotation shifter 130 provided on the reception side in the case where the transfer word in FIG. 29 has correctly been received. With respect to the first reception transfer word 154-2, since m=1, the bit shift amount is equal to m−1=0 and the first reception transfer word is outputted as it is without bit shifting. As for the second reception transfer word 156-2, since m=2, its bit shift amount is equal to m−1=1 and the second reception transfer word is shifted to the right by one bit (toward the lower side) and is outputted. As for the third reception transfer word 158-2, since m=3, its bit shift amount is equal to m−1=2 and the third reception transfer word is shifted to the right by two bits (toward the lower side) and is outputted. Thus, the data bits are returned to the original bit arrangement.

Figure 31:
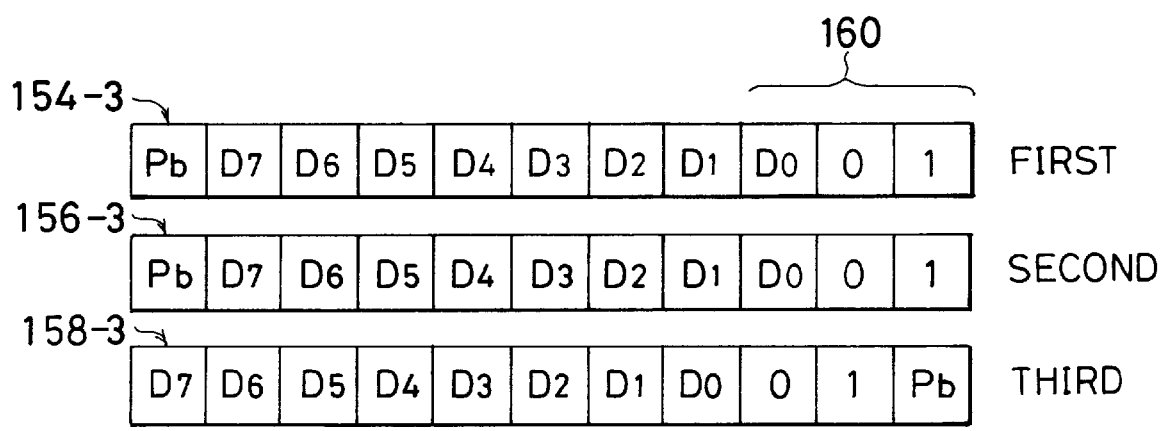
FIG. 31 is an explanatory diagram of transfer words after completion of the reverse shift at the time of abnormal reception.

FIG. 31 shows an abnormal reception in the case where the third transmitted transfer word had been lost and the fourth transmitted transfer word was received at t he third time. With respect to the first and second reception transfer words 154-3 and 156-3, their bits are returned to the original bit arrangements by the bit shifting process in a manner similar to the case of FIG. 30. However, in case of a reception transfer word 158-3 which was received at the third time and should inherently be the fourth reception transfer word, even if it is returned by the b it shifting process, a correct bit arrangement is not obtained and the reception transfer word has been deviated by one bit.

With regard to the transfer words which were shown in FIGS. 30 and 31 and were returned to the original bit arrangements by the bit shifting processes, the error detecting circuit 134 designates lower three bits to reception side judgment bits 160 and discriminates the presence or absence of an error. FIG. 32 shows references of the error judgment for the reception side judgment bits. First, in case of a judgment bit X01, since lower two bits coincide with the bit arrangement 01 of the transmission side judgment bits 152 added on the transmission side shown in FIG. 28, the transfer data is decided to be correct. X indicates that the bit value is equal to 0 or 1. On the other hand, when lower two bits of the reception side judgment bits don't coincide with the bit arrangement 01 of the transmission side judgment bits, it is decided that there is an error in the transfer data. The contents of the error judgment can be classified into the following four kinds of contents.

I. When the bit arrangement is equal to 01X, it is decided that one word was lost.

II. When the bit arrangement is equal to 1XX, it is decided that two or more words were lost.

III. When the bit arrangement is equal to 000, it is decided that a 0 fixed failure in which all of the bits are equal to 0 occurred.

IV. When the bit arrangement is equal to 111, it is decided that a 1 fixed failure in which all of the bits are equal to 1 occurred.

The fixed failure in which the bit arrangement of the judgment bits is equal to 000 or 111 occurs in the case where a fatal trouble occurred in the hardware of the transmitting system. Therefore, by merely expanding the data word by two bits, a loss of word itself can be detected. Since the 0 fixed value and 1 fixed value of the transmission side judgment bits are shifted, the fixed failure in which all of the bits are equal to 1 or 0 is always monitored. Further, the above method can be commonly used together with the bit error detecting method by the parity bit and the error can be detected at an improved reliability. Such a data transfer apparatus shown in FIG. 26 in which the necessary minimum number of redundant bits are added to the word data can be applied to a high-speed transmitting system having a possibility of the occurrence of a phenomenon such that the data itself is lost by a trouble of the write signal such as a transfer or the like via the FIFO memory in the parallel data distributing mechanism 24 provided in the 3-dimensional graphics display apparatus shown in FIG. 11.

Although the above embodiment has been described with respect to the case of constructing one span data by 12 words as an example, the number of words constructing one span data can be arbitrarily set as necessary. Although one pixel has been constructed by eight span data, the number of span data can be also arbitrarily determined in accordance with the number of parallel drawing processes. Further, although the above embodiment has been described with respect to the parallel high-speed transfer of the drawing data as an example, the invention is not limited to such an example but can be also applied to a general communication system. The present invention is obviously not limited by the numerical values shown in the embodiment.

What is claimed is:

1. A data transfer apparatus to transfer data on a word unit basis while setting a predetermined bit length to one word, comprising:

first processing means for setting a predetermined number of words into one group and for designating a write destination of a transfer word by an upper bit portion of a write destination selection address, for designating the kind of transfer word by a lower bit portion of said write destination selection address, and for requesting a writing of the transfer word, wherein a transfer word comprises a drawing instruction command and drawing parameters and, wherein the same write destination selection address is generated each time the writing operation of transfer words belonging to the same group is requested;

second processing means for setting a predetermined number of words into one group and for designating a read destination of the transfer word by an upper bit portion of a read destination selection address, for designating the kind of transfer word by a lower bit portion of said read destination selection address, and for requesting a reading of the transfer word wherein the same read destination selection address is generated each time the reading operation of transfer words belonging to the same group is requested;

FIFO memory means in which at least one word memory area is constructed by a portion to store the transfer word and a portion to store additional data and the data is stored into each said word memory area in a first-in first-out manner;

write control means for controlling upon writing by said first processing means, the upper bit portion of the write destination selection address is decoded and when a write selection signal is made effective, the lower bit portion of the write destination selection address is added as an ID flag to the transfer word, and the resultant data is written into said FIFO memory means;

read control means for controlling upon reading by said second processing means, the upper bit portion of said read destination selection address is decoded and when a write selection signal is made effective, read data is read out from said FIFO memory means together with the ID flag; and judging means for comparing the ID flag read out by said read control means and the lower bit portion of the read destination selection address from said second processing means, for judging whether the read-out transfer word is correct or not, and for notifying the occurrence of a transfer error when they don't coincide.

2. An apparatus according to claim 1, wherein said first processing means, said FIFO memory means, said write control means, and said read control means are constructed as one set, a plurality of said sets are provided, said second processing means is provided as one common unit, the writing operation of parallel transfer words is requested to the corresponding FIFO memory means by a plurality of said first processing means, either one of said plurality of FIFO memory means is selected by said single second processing means, and the reading operation of the transfer word is requested.

3. An apparatus according to claim 1, wherein said second processing means, said FIFO memory means, said write control means, and said read control means are constructed as one set, a plurality of said sets are provided, said first processing means is provided as one common unit, either one of said plurality of FIFO memory means is selected by said single first processing means, the writing operation is requested, and the reading operations of parallel transfer words are requested to the corresponding FIFO memory means by said plurality of second processing means.

4. An apparatus according to claim 1, wherein the transfer words of said one group include a command in the first word, and the remaining words are constructed by parameters which are used in processes based on said command.

5. An apparatus according to claim 1, wherein the lower bit portion of the write destination selection address which is generated by said first processing means is constructed by an ID flag to discriminate whether the transfer word indicates a command or parameters.

6. An apparatus according to claim 1, wherein said drawing parameters include: 3-dimensional coordinate values of a start point and an end point of a line segment; each color value of the start and end points of the line segment; and an increased amount value to interpolate pixels into a portion between the start point to the end point of the line segment.

7. A data transfer apparatus to transfer data on a word unit basis while setting a predetermined bit length to one word, comprising:

first processing means for setting a predetermined number of words into one group and for designating a write destination of a transfer word by an upper bit portion of a write destination selection address, for designating the kind of transfer word by a lower bit portion of said write destination selection address, and for requesting a writing of the transfer word, wherein a transfer word of one group comprises a command in the first word of the group and wherein the remaining words comprise parameters based on the command, and the same write destination address is generated each time the writing operation of transfer words belonging to the same group is requested;

second processing means for setting a predetermined number of words into one group and for designating a read destination of the transfer word by an upper bit portion of a read destination selection address, for designating the kind of transfer word by a lower bit portion of said read destination selection address, and for requesting a reading of the transfer word, wherein the same read destination address is generated each time the reading operation of transfer words belonging to the same group is requested;

FIFO memory means in which a word memory area is constructed by a portion to store the transfer word and a portion to store additional data and the data is stored into said memory area in a first-in first-out manner;

write control means for controlling upon writing by said first processing means, the upper bit portion of the write destination selection address is decoded and when a write selection signal is made effective, the lower bit portion of the write destination selection address is added as an ID flag to the transfer word, and the resultant data is written into said FIFO memory means;

read control means for controlling upon reading by said second processing means, when a first selection signal in which both of the upper bit portion of said read destination selection address and the lower bit portion having a value to indicate the kind of data to be read out were decoded is made effective, only said ID flag is read out from said FIFO memory means, and when a second selection signal in which both of the upper bit portion of said read destination selection address and the lower bit portion having a value to indicate the reading operation of the transfer word were decoded is made effective, only the transfer word is read out from said FIFO memory means; and judging means for comparing the ID flag read out by said read control means and the lower bit portion in which the reading of the ID flag was instructed, thereby judging whether the transfer word is correct or not.

8. An apparatus according to claim 7, wherein a value of the lower bit portion indicative of the reading of the ID flag is set to an odd number, and a value of the lower bit portion indicative of the reading of the transfer word is set to an even number.

9. An apparatus according to claim 7, wherein a value of the lower bit portion to indicate the reading operation of said ID flag is set to an even number, and a value of the lower bit portion to indicate the reading operation of the transfer word is set to an odd number.

10. An apparatus according to claim 7, wherein when said ID flag doesn't coincide with the lower bit portion, said judging means skips the reading operation of the word memory area in said FIFO memory means until the ID flag which coincides with the lower bit portion is obtained and reads out the transfer word in the word memory area which coincides with the lower bit portion.

11. An apparatus according to claim 7, wherein said first processing means, said FIFO memory means, said write control means, and said read control means are constructed as one set, a plurality of said sets are provided, said second processing means is provided as one common unit, writing operations of parallel transfer words are requested to the corresponding FIFO memory means by a plurality of first processing means, either one of said plurality of FIFO memory means is selected by said single second processing means, and a reading operation of the transfer word is requested.

12. An apparatus according to claim 7, wherein said second processing means, said FIFO memory means, said write control means, and said read control means are constructed as one set, a plurality of said sets are provided, said first processing means is provided as one common unit, either one of said plurality of FIFO memory means is selected by said single first processing means, a writing operation is requested, and reading operations of parallel transfer words are requested to the corresponding FIFO memory means by said plurality of second processing means.

13. An apparatus according to claim 7, wherein the lower bit portion of the write destination selection address which is generated by said first processing means is set to an ID flag to discriminate whether the transfer word of one word indicates a command or parameters.

14. An apparatus according to claim 7, wherein the transfer words of said one group are constructed by a drawing instruction command and drawing parameters.

15. An apparatus according to claim 14, wherein said drawing parameters include: 3-dimensional coordinate values of a start point and an end point of a line segment; each color value at the start and end points of the line segment; and increased amount values to interpolate pixels between the start point and the end point of the line segment.

16. A data transfer method for transferring data on a word unit basis while setting a predetermined bit length into one word, comprising the steps of:

setting a predetermined number of words into one group;

designating a write destination of the transfer word by an upper bit portion of a write destination selection address, designating the kind of transfer word by a lower bit portion of the write destination selection address, and requesting a writing of the transfer word wherein a transfer word comprises a drawing instruction command and drawing parameters and, wherein the same write destination selection address is generated each time the writing operation of transfer words belonging to the same group is requested;

interpreting the upper bit portion of said write destination selection address and, when a selection signal is made effective, adding the lower bit portion of the write destination selection address to the transfer word as an ID flag, and writing the resultant data into a FIFO memory means whose word memory area is constructed by a portion to store the transfer word and a portion to store additional data and into which data is stored in a first-in first-out manner;

designating a read destination of the transfer word by an upper bit portion of a read destination selection address, designating the kind of transfer word by a lower bit portion of said read destination selection address, and requesting a reading of the transfer word, wherein the same read destination selection address is generated each time the reading operation of transfer words belonging to the same group is requested;

decoding the upper bit portion of the read destination selection address from the FIFO memory means and, when a selection signal is made effective, reading out the write data together with said ID flag; and comparing the ID flag read out from the FIFO memory means and the lower bit portion of the read destination selection address and notifying the occurrence of a transfer error when they don't coincide.

17. A data transfer method for transferring data on a word unit basis while setting a predetermined bit length into one word, comprising the steps of:

setting a predetermined number of words into one group;

designating a write destination of the transfer word by an upper bit portion of a write destination selection address, designating the kind of transfer word by a lower bit portion of the write destination selection address, and requesting a writing of the transfer word wherein a transfer word comprises a drawing instruction command and drawing parameters and, wherein the same write destination selection address is generated each time the writing operation of transfer words belonging to the same group is requested;

interpreting the upper bit portion of said write destination selection address and, when a selection signal is made effective, adding the lower bit portion of the write destination selection address to the transfer word as an ID flag, and writing the resultant data into FIFO memory means whose word memory area is constructed by a portion to store the transfer word and a portion to store additional data into which data is stored in a first-in first-out manner;

designating a read destination of the transfer word by an upper bit portion of a read destination selection address, designating the kind of transfer word by a lower bit portion of said read destination selection address, and requesting a reading of the transfer word wherein the same read destination selection address is generated each time the reading operation of transfer words belonging to the same group is requested;

reading out only the ID flag from the FIFO memory means when a first selection signal in which the upper bit portion of the read destination selection address and the lower bit portion having a value to indicate the kind of data to be read out were decoded together is made effective;

reading out only the transfer word from said FIFO memory means when a second selection signal in which the upper bit portion of the read destination selection address and the lower bit portion having a value to indicate the reading operation of the transfer word were decoded is made effective; and comparing the ID flag read out from the FIFO memory means and the lower bit portion of the read destination selection address which has indicated the reading operation of the ID flag and judging whether the transfer word is proper or improper.

18. A method according to claim 17, wherein when the ID flag doesn't coincide with the lower bit portion of the read destination selection address, the reading operation of the word memory area in the FIFO memory means is skipped until the ID flag which coincides with said lower bit portion is obtained, and the transfer word in the word memory area which coincides with the lower bit portion is read out.

* * * * *